United States Patent
Canaday et al.

(10) Patent No.: US 11,725,436 B2
(45) Date of Patent: *Aug. 15, 2023

(54) ELECTRICAL PANELBOARD GUARD WITH COUPLED MEMBERS

(71) Applicant: ADK Electric Corporation, Englewood, CO (US)

(72) Inventors: Timothy Kit Canaday, Elizabeth, CO (US); Christopher Anthony Canaday, Thornton, CO (US)

(73) Assignee: ADK ELECTRIC CORPORATION, Englewood, CO (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/329,294

(22) Filed: May 25, 2021

(65) Prior Publication Data

US 2021/0340796 A1 Nov. 4, 2021

Related U.S. Application Data

(63) Continuation of application No. 16/269,061, filed on Feb. 6, 2019, now Pat. No. 11,028,622, which is a (Continued)

(51) Int. Cl.
*E05C 19/00* (2006.01)
*B65B 5/04* (2006.01)
*E05C 19/18* (2006.01)
*H02B 1/06* (2006.01)
*H02B 1/14* (2006.01)

(52) U.S. Cl.
CPC .............. *E05C 19/006* (2013.01); *B65B 5/04* (2013.01); *E05C 19/003* (2013.01); *E05C 19/188* (2013.01); *H02B 1/14* (2013.01); *H02B 1/06* (2013.01); *Y10T 29/49947* (2015.01);
(Continued)

(58) Field of Classification Search
CPC ...... E05C 19/003; E05C 19/186; E05C 19/18; E05C 19/182; E05C 19/184; E05C 19/006; E05C 19/188; E05B 65/44; A47B 67/02; B65B 5/04; H02B 1/06; H02B 1/066; H02B 1/14; Y10T 29/49963; Y10T 29/49947; Y10T 29/49966; Y10T 70/40; Y10T 70/5168; Y10T 292/228; Y10T 292/23; Y10T 292/34; Y10T 292/37; Y10T 292/237; Y10T 292/376; Y10T 292/20;
(Continued)

(56) References Cited

U.S. PATENT DOCUMENTS 601,316 A * 3/1898 Dickson
712,656 A * 11/1902 Craven
(Continued)

*Primary Examiner* — Christine M Mills
*Assistant Examiner* — Faria F Ahmad
(74) *Attorney, Agent, or Firm* — Polsinelli PC

(57) ABSTRACT

Disclosed herein is a panelboard guard assembly configured to restrict access to a panelboard having a cover and a door defined therein, the cover having first and second side edges. The panelboard guard assembly includes overlapping members that are, at least in some implementations, mutually coupled to each other. The panelboard guard assembly further includes an adjustment mechanism that extends between and couples the members together, the adjustment mechanism facilitating adjustment of the distance between the outer ends of the members.

18 Claims, 19 Drawing Sheets

Related U.S. Application Data continuation-in-part of application No. 15/014,964, filed on Feb. 3, 2016, now Pat. No. 10,227,802, which is a continuation of application No. 13/768,957, filed on Feb. 15, 2013, now Pat. No. 9,284,760.

(60) Provisional application No. 61/602,436, filed on Feb. 23, 2012.

(52) U.S. Cl.
CPC .... *Y10T 29/49963* (2015.01); *Y10T 29/49966* (2015.01); *Y10T 292/237* (2015.04)

(58) Field of Classification Search
CPC .... Y10T 292/221; Y10T 292/67; Y10S 70/64; Y10S 70/65; Y10S 70/66
USPC ........ 70/14, 94, DIG. 64, DIG. 65, DIG. 66; 292/258, 259 R, 288, 289, 260, 291, 256, 292/256.73, 339; 200/43.14, 43.22; 312/216, 245
See application file for complete search history.

(56) References Cited

U.S. PATENT DOCUMENTS

| | | | | |
|---|---|---|---|---|
| 994,001 | A * | 5/1911 | Hunt | |
| 1,239,802 | A * | 9/1917 | Macbeth | E05C 19/18 292/258 |
| 1,395,970 | A * | 11/1921 | Nidermaier | B60R 25/008 70/226 |
| 1,494,717 | A * | 5/1924 | Sell | B60R 25/066 70/203 |
| 1,756,185 | A * | 4/1930 | Falck | A61G 17/036 292/256.73 |
| 1,989,781 | A * | 2/1935 | Zak | G09F 21/04 292/259 R |
| 2,495,860 | A * | 1/1950 | Miller | E05C 19/186 292/288 |
| 2,542,621 | A * | 2/1951 | Bober | B65D 45/28 294/34 |
| 2,556,900 | A * | 6/1951 | Buschhorn | E05B 73/0076 70/230 |
| 2,942,476 | A * | 6/1960 | Turner | G01P 15/0888 73/514.04 |
| 3,280,606 | A * | 10/1966 | Howard | E05C 19/003 292/259 R |
| 3,643,478 | A * | 2/1972 | McPeake | E05B 13/002 292/259 R |
| 3,665,736 | A * | 5/1972 | Wilson | E05B 73/00 292/259 R |
| 4,003,227 | A * | 1/1977 | Casey | E05B 13/002 70/14 |
| 4,372,136 | A * | 2/1983 | Mickelson | E05C 19/186 70/91 |
| 4,389,862 | A * | 6/1983 | Hastings | E05C 19/186 292/205 |
| 4,858,867 | A * | 8/1989 | King | A47G 25/54 206/289 |
| 5,018,690 | A * | 5/1991 | Widmer | E01B 7/20 292/113 |
| 5,020,342 | A * | 6/1991 | Doan | E05B 67/383 292/307 R |
| 5,203,597 | A * | 4/1993 | Wheelock | E05C 19/18 292/288 |
| 5,209,533 | A * | 5/1993 | Menard | E05C 19/18 292/288 |
| 5,267,688 | A * | 12/1993 | Benefield | A47G 29/1201 70/164 |
| D346,106 | S * | 4/1994 | Walls | D8/394 |
| 5,365,757 | A * | 11/1994 | Primeau | E05B 67/383 292/307 R |
| 5,419,165 | A * | 5/1995 | Perkins | E05B 67/383 292/288 |
| 5,447,346 | A * | 9/1995 | Virzi | E05B 65/0888 292/289 |
| 5,452,929 | A * | 9/1995 | Anderson | E05C 19/003 292/259 R |
| 5,462,323 | A * | 10/1995 | Benninger | E05B 65/0894 292/288 |
| 5,503,212 | A * | 4/1996 | Lin | B60J 11/02 292/288 |
| 5,620,215 | A * | 4/1997 | Janeway | E05C 19/186 292/288 |
| 5,865,485 | A * | 2/1999 | Lawhorne, Jr. | E05C 19/003 292/288 |
| 6,263,709 | B1 * | 7/2001 | Kemery | A63C 11/006 70/58 |
| 6,311,530 | B1 * | 11/2001 | Woodward | E05C 19/186 70/164 |
| 6,591,641 | B1 * | 7/2003 | Cann | E05C 19/186 292/259 R |
| 6,619,708 | B1 * | 9/2003 | Naylor | E05C 19/186 292/259 R |
| 6,737,594 | B2 * | 5/2004 | Helms | H01H 9/286 200/43.14 |
| 6,791,040 | B1 * | 9/2004 | Puhalla | H01H 9/283 200/43.14 |
| 6,834,896 | B2 * | 12/2004 | Smith | E05C 19/18 292/259 R |
| 7,178,840 | B1 * | 2/2007 | Veach | E05C 19/186 292/259 R |
| 7,278,663 | B2 * | 10/2007 | Witchey | E05C 19/186 292/259 R |
| 7,325,281 | B1 * | 2/2008 | Willems | B60R 25/00 292/259 R |
| 7,681,421 | B2 * | 3/2010 | Cannon | H02B 1/38 70/164 |
| 8,791,362 | B2 * | 7/2014 | Kumar | H02B 1/38 174/53 |
| 9,284,760 | B2 * | 3/2016 | Canaday | E05C 19/006 |
| 10,227,802 | B2 * | 3/2019 | Canaday | E05C 19/188 |
| 11,028,622 | B2 * | 6/2021 | Canaday | E05C 19/003 |
| 2007/0033971 | A1 * | 2/2007 | Nasin | H02B 1/38 70/164 |
| 2012/0061529 | A1 * | 3/2012 | Hill | H01R 4/48 248/65 |
| 2013/0213907 | A1 * | 8/2013 | Masse | H02B 1/01 211/26 |

\* cited by examiner

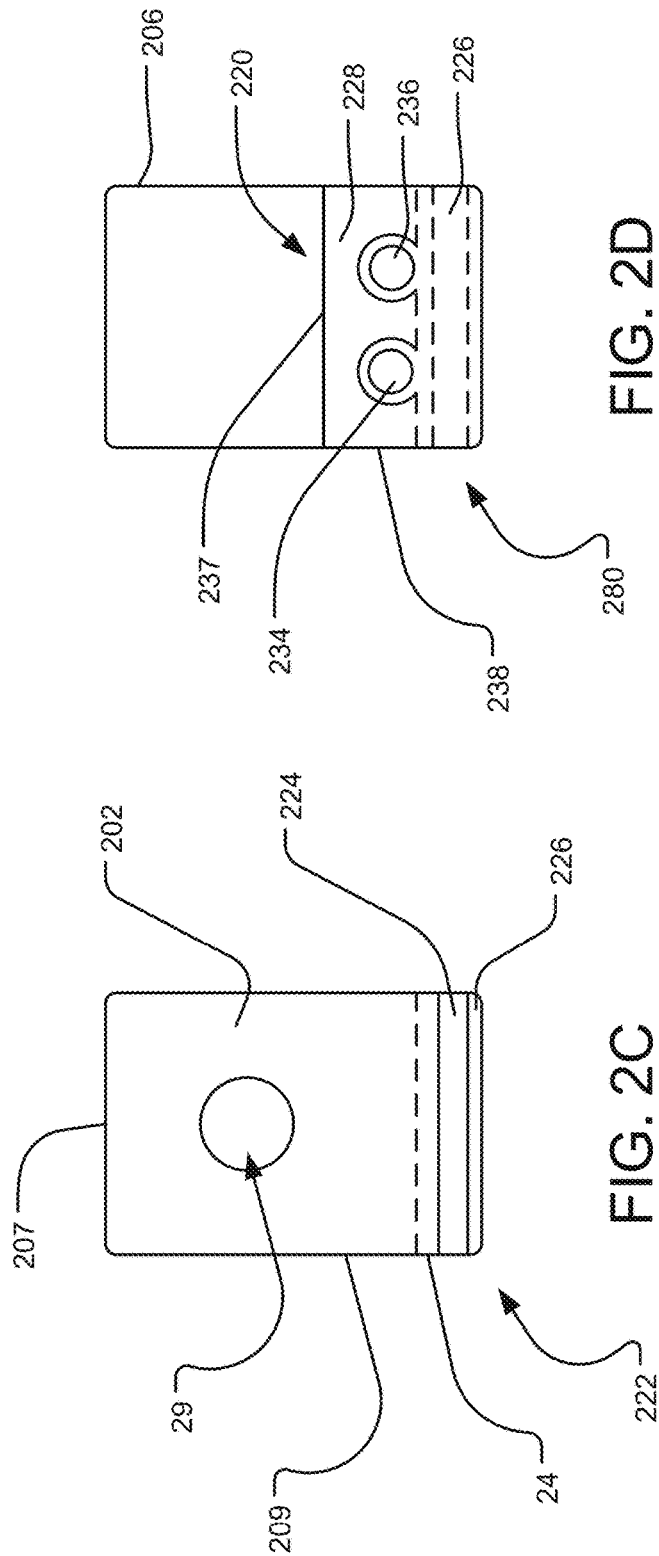
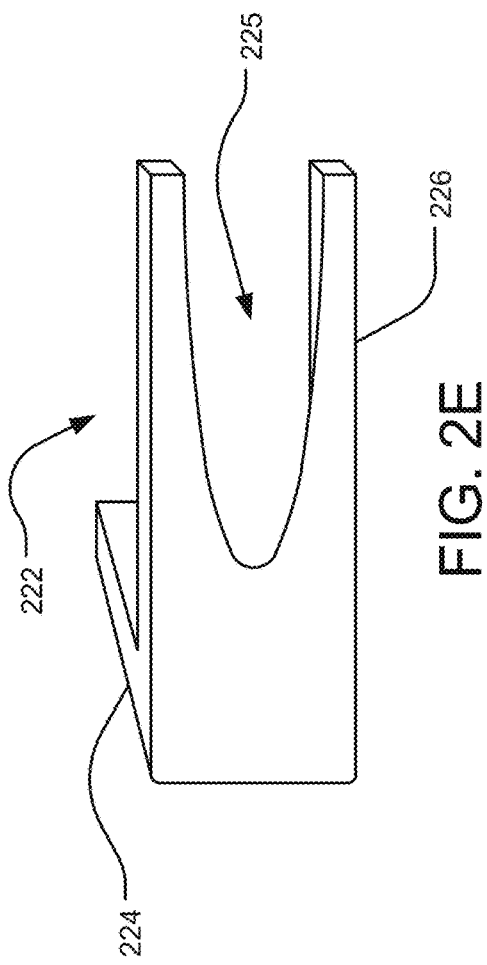

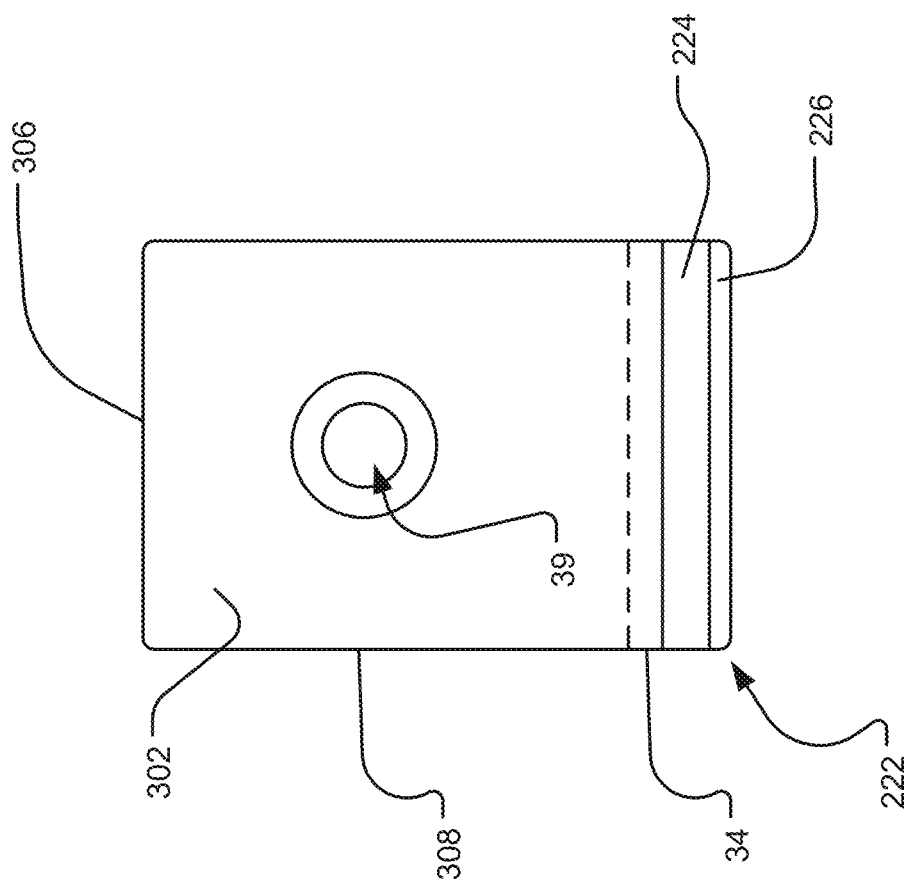

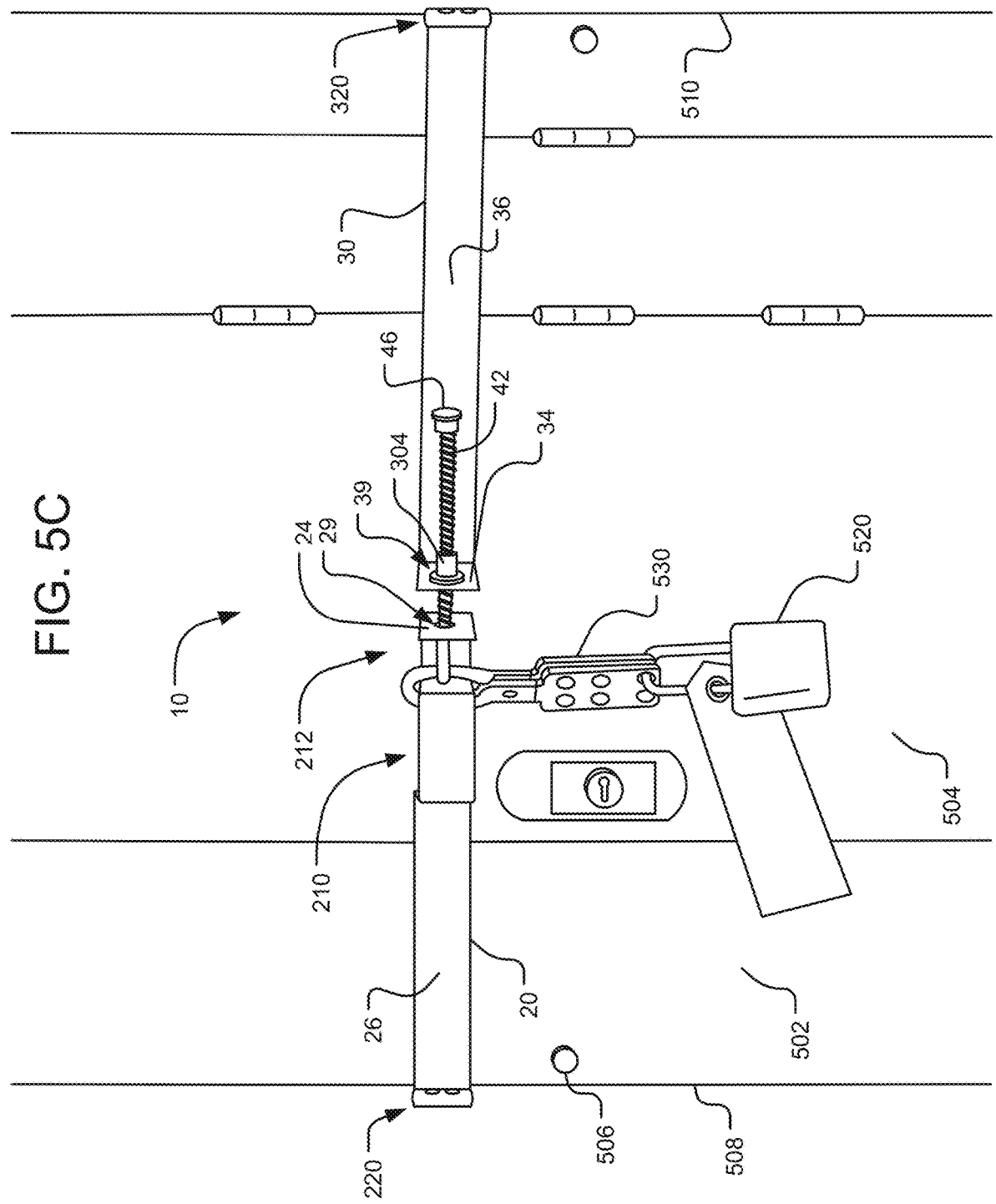

ELECTRICAL PANELBOARD GUARD WITH COUPLED MEMBERS

CROSS-REFERENCE TO RELATED APPLICATIONS

The present application is a continuation of U.S. application Ser. No. 16/269,061 filed Feb. 6, 2019, now U.S. Pat. No. 11,028,622, which application is a continuation-in-part of U.S. application Ser. No. 15/014,964, filed Feb. 3, 2016, now U.S. Pat. No. 10,227,802, which is a continuation of U.S. application Ser. No. 13/768,957, filed Feb. 15, 2013, now U.S. Pat. No. 9,284,760, which claims priority to and the benefit under 35 U.S.C. § 119(e) of U.S. Provisional Patent Application No. 61/602,436, which was filed on Feb. 23, 2012. The contents of the above-mentioned patent applications are hereby incorporated by reference in their entireties.

FIELD OF DISCLOSURE

The present disclosure relates to panelboards and, more particularly, devices and methods for securing panelboard guards.

BACKGROUND

Lockout and tag-out is a safety process maintenance personnel are required to follow to ensure electrical maintenance safety. A number of procedures outlined by the Occupational Safety and Health Administration (OSHA) are designed to prevent an unexpected startup of electrical machinery or equipment during maintenance and repairs. One such safety regulation requires access to circuit breakers and panelboards be controlled by electricians working on circuitry or equipment. Currently this is accomplished by a number of different methods. For example, locks are provided on de-energized or turned off circuit breakers or de-energized circuit breakers are tagged and then access to panelboards is controlled by simply locking panelboards or doors to electrical closets, rooms or areas where panelboards are located.

However, all of these methods present a number of challenges. To begin with, the use of breaker locks, which are usually supplied by a third party, requires that such locks be built specifically for the breakers being locked. Because of the extremely numerous breaker designs that have been employed in facilities over the years, it is often not feasible to have a stock of the vast variety of breaker lockouts on hand, especially in any amount.

As the design of the circuit breakers change, a portion of these circuit breakers become obsolete. Also, new or unknown lockout requirement arise. Whether faced with obsolescence or new or unknown lockout requirements, procuring a specific breaker lockout will still be required, which often takes a significant amount of time even if the needed lock is available at all. Furthermore, the breaker lock-outs are often costly and not very durable.

Although the panelboards are typically provided with a locking handle or a latch, the same key is often supplied by each manufacturer for their particular line of panelboards. In a large commercial building setting in which hundreds of panels are located, hundreds of sets of identical keys may be available to a host of individuals, thereby making controlling of the access to the panelboards very difficult. Also, because each panelboard typically comes with only a single keyed latch, the use of a multiple user lockout or tag-out hasps, such as those required in crew or multi-discipline scenarios, is not possible. While controlling access to electrical closets, rooms or areas with panelboards is yet another option for limiting access to a panelboard, such control is becoming more of an issue as building management or security personnel are becoming more reluctant to relinquish keys in today's heightened security environment. Also, ensuring that all personnel follow instituted procedures for locking out these areas is often difficult.

Thus, there is a need in the art for a device for, and a method of, locking panelboards easily and securely to ensure compliance with safety regulations.

BRIEF SUMMARY

Disclosed herein is a panelboard guard assembly configured to restrict access to a panelboard having a cover and a door defined therein, the cover having first and second side edges. In one embodiment, the panelboard guard assembly includes a first strap, a second strap, and an adjusting mechanism. The first strap has a first outer end and a first inner end. The second strap has a second outer end and a second inner end. The adjusting mechanism extends between and couples the first strap and the second strap at the first and second inner ends.

Depending on the embodiment, the first strap may further include a first attachment structure at the first outer end, the first attachment structure being configured to attach the first strap to the panelboard cover. Similarly, the second strap may further include a second attachment structure at the second outer end, the second attachment structure being configured to attach the second strap to the panelboard cover. The first and the second attachment structures may each be configured to respectively engage the first and second side edges of the panelboard cover.

Depending on the embodiment, the first and second attachment structures each define a respective gap configured to receive therein at least a portion of the panelboard cover. Depending on the embodiment, the first and second attachment structures each include a structure configured to extend underneath the panelboard cover at the respective side edge. Such a structure configured to extend underneath the panelboard cover may be formed of an electrically nonconductive material. Additionally or alternatively, such a structure configured to extend underneath the cover may include a notch defined therein, thereby allowing the straps to be located over the head of a panelboard cover screw, the shaft of the screw being received in the notch.

Depending on the embodiment, the structure configured to extend underneath the cover is a wraparound mounting structure. The wrap around mounting structure has an L-shaped member having a short portion and a long portion. The short portion of the L-shaped member is interposed between a first wall and a second wall of the respective strap. The L-shaped member may be constructed from a nonconductive material.

Depending on the embodiment, the adjusting mechanism includes a threaded shaft. The adjusting mechanism is rotatably coupled to the first inner end and threadably coupled to the second inner end. Rotating the adjusting mechanism in a first direction decreases the overall length of the assembly and rotating the adjusting mechanism in a second direction opposite the first direction increases the overall length.

Depending on the embodiment, the adjusting mechanism includes an end configured to couple with at least one of a safety lockout padlock or a safety lockout hasp. For example, the end of the adjusting mechanism may include an eyebolt hole through which the at least one of a safety lockout padlock or a safety lockout hasp can extend. The first strap may be configured such that the at least one of a safety lockout padlock or a safety lockout hasp extends around a portion of the first strap while being coupled to the end of the adjusting mechanism.

Depending on the embodiment, the adjusting mechanism may include a shaft with a series of holes located along the shaft and spaced apart from each other in an incremental arrangement. The holes may be sized such that at least one of a safety lockout padlock or a safety lockout hasp can extend through the holes.

Disclosed herein is a method for restricting access to a panelboard. In one embodiment, the method includes: securing a first outer end of a first strap of a panelboard guard assembly to a first edge of a cover of the panelboard; securing a second outer end of a second strap of the panelboard guard assembly to a second edge of a cover of the panelboard, the panelboard guard assembly extending across an access door defined in the cover of the panelboard; coupling a first inner end of the first strap to a second inner end of the second strap via an adjustment mechanism coupled to both inner ends; and adjusting the adjustment mechanism to substantially remove slack in the panelboard guard assembly extending across the access door followed by locking the adjustment mechanism via a safety lockout mechanism.

Depending on the embodiment, the lockout mechanism is at least one of a safety lockout padlock or a safety lockout hasp. The securing the outer ends to the respective edges may include extending a portion of the outer ends behind the panelboard cover at the edges.

Depending on the embodiment, the adjusting the adjustment mechanism to substantially remove slack in the panelboard guard assembly may include rotating the adjustment mechanism relative to the second strap. Alternatively, the adjusting the adjustment mechanism to substantially remove slack in the panelboard guard assembly may include sliding the adjustment mechanism relative to the second strap.

In another aspect of the present disclosure, a panelboard guard assembly configured to restrict access to a panelboard having a cover having first and second side boundaries and a door defined therein by using a safety lockout is provided. The panelboard guard assembly includes a first member including a first outer end and a first inner end, the first outer end including a first open channel shaped to extend about and releasably receive the first side boundary to couple the first member to the first side boundary. The panelboard guard assembly further includes a second member including a second outer end and a second inner end, the second outer end including a second open channel shaped to extend about and releasably receive the second side boundary to couple the second member to the second side boundary. An adjustment member extends between the first inner end and the second inner end and movement of the adjustment member relative to both the first inner end and the second inner end results in a change in a distance between the first outer end and the second outer end. The first member and the second member are arranged such that at least a portion of the first member is disposed between the second outer end and the second inner end.

In yet another aspect of the present disclosure, a panelboard guard assembly configured to restrict access to a panelboard having a cover including first and second side boundaries and a door defined therein by using a safety lockout is provided. The panelboard guard assembly includes a first member including a first outer end and a first open channel shaped to extend about and releasably receive the first side boundary to couple the first member to the first side boundary. The panelboard guard assembly further includes a second member including a second outer end and a second open channel shaped to extend about and releasably receive the second side boundary to couple the second member to the second side boundary. An adjustment member extends between the first member and the second member such that wherein movement of the adjustment member relative to the first member and the second member results in a change in a distance between the first outer end and the second outer end. The first member and the second member are cross-coupled such that a first portion of the first member is retained by a first portion of the second member and a second portion of the second member is retained by a second portion of the first member.

In still another aspect of the present disclosure, a panelboard guard assembly configured to restrict access to a panelboard having a cover including first and second side boundaries and a door defined therein by using a safety lockout is provided. The panelboard guard assembly includes a first member including a first outer end having a first open channel shaped to extend about and releasably receive the first side boundary to couple the first member to the first side boundary. The panelboard guard assembly further includes a second member including a second outer end comprising a second open channel shaped to extend about and releasably receive the second side boundary to couple the second member to the second side boundary. An adjustment mechanism operably couples the first member to the second member and is configured to couple to the first member via the safety lockout and to change a distance between the first outer end and the second outer end. A first portion of the first member also extends through a first portion of the second member, thereby coupling the members.

BRIEF DESCRIPTION OF THE DRAWINGS

FIGS. 2C and 2D are enlarged end views of an outer and inner ends of the first strap.

FIG. 2E is an enlarged isometric view of an L-shaped member according to one embodiment.

FIG. 3C is an enlarged end view of an inner end of the second strap.

FIGS. 5A-5C are perspective views of the panelboard guard assembly secured to a panelboard with different lockout and tag-out devices.

DETAILED DESCRIPTION

Figure 1:
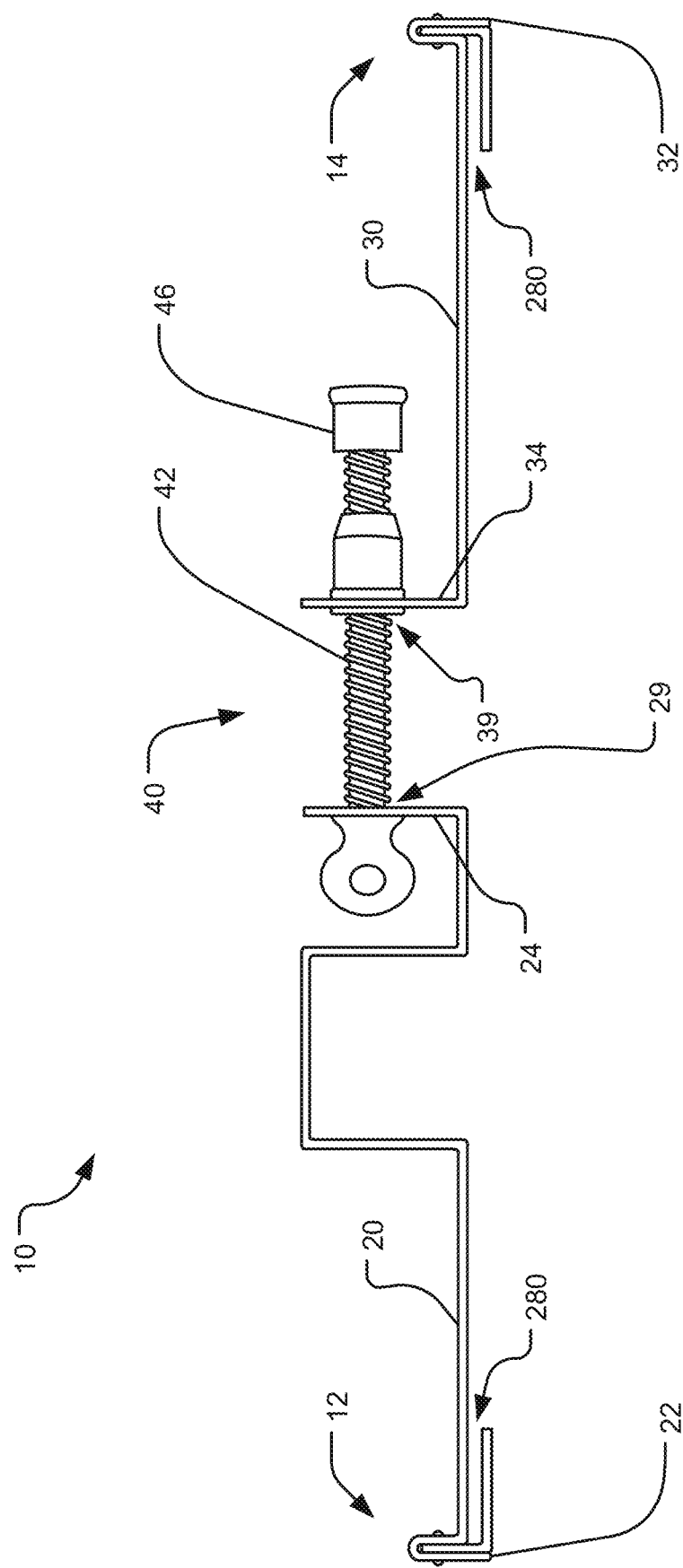
FIG. 1 is a side view of a panelboard guard assembly.

A panelboard guard assembly is disclosed herein. The panelboard guard assembly 10 is designed such that a lockout process can be simplified and some of the challenges faced with the prior art devices and methods can be overcome. Specifically, in one embodiment, the panelboard guard assembly 10 is configured so as to be capable of being applied to most, if not all, panelboards for lockout purposes.

As discussed in detail below, in one embodiment, the panelboard guard assembly 10 is a locking strap assembly intended to enable the use of industry standard lockout or tag-out devices on existing commercial panelboard covers. In particular, the panelboard guard assembly disclosed includes a pair of adjacent straps 20 and 30 coupled together by an adjusting mechanism 40. The adjusting mechanism 40, which allows a user to adjust the length of the panelboard guard 10 to the width of a panelboard or cover on which it is to be secured, includes an aperture 44 or other feature at one end for accepting personal protective equipment (PPE) locking mechanisms.

For a detailed discussion of a first embodiment of the panelboard guard assembly 10, reference is now made to FIG. 1, which is a side view of the panelboard guard assembly. As shown in FIG. 1, the panelboard guard assembly 10 includes a pair of adjacent straps 20 and 30 coupled together in an end-to-end arrangement by an adjusting mechanism 40. The panelboard guard has a first end 12 and a second end 14 opposite and spaced apart from the first end. The straps 20 and 30, which, in one embodiment, are essentially of the same length, are further defined by an outer first ends 22, 32 and inner second ends 24, 34. The outer first end 22 of the strap 20 corresponds to the first end 12 of the panelboard guard assembly 10. The inner second end 24 of the strap 20 is located opposite and spaced apart from the outer first end 22. Similarly, the strap 30 is defined by the outer first end 32, which corresponds to the second end 14 of the panelboard guard assembly, and the inner second end 34, which is located opposite and spaced apart from the outer first end 32.

As illustrated in FIG. 1, the adjusting mechanism 40 is located in the center of the panelboard guard 10 so as to extend through the inner second ends 24, 34. Specifically, the adjusting mechanism 40 includes a threaded member 42 that extends between straps 20 and 30 through a pair of apertures 29 and 39 respectively located at the inner second ends 24 and 34 of the straps 20 and 30.

Figure 2A:
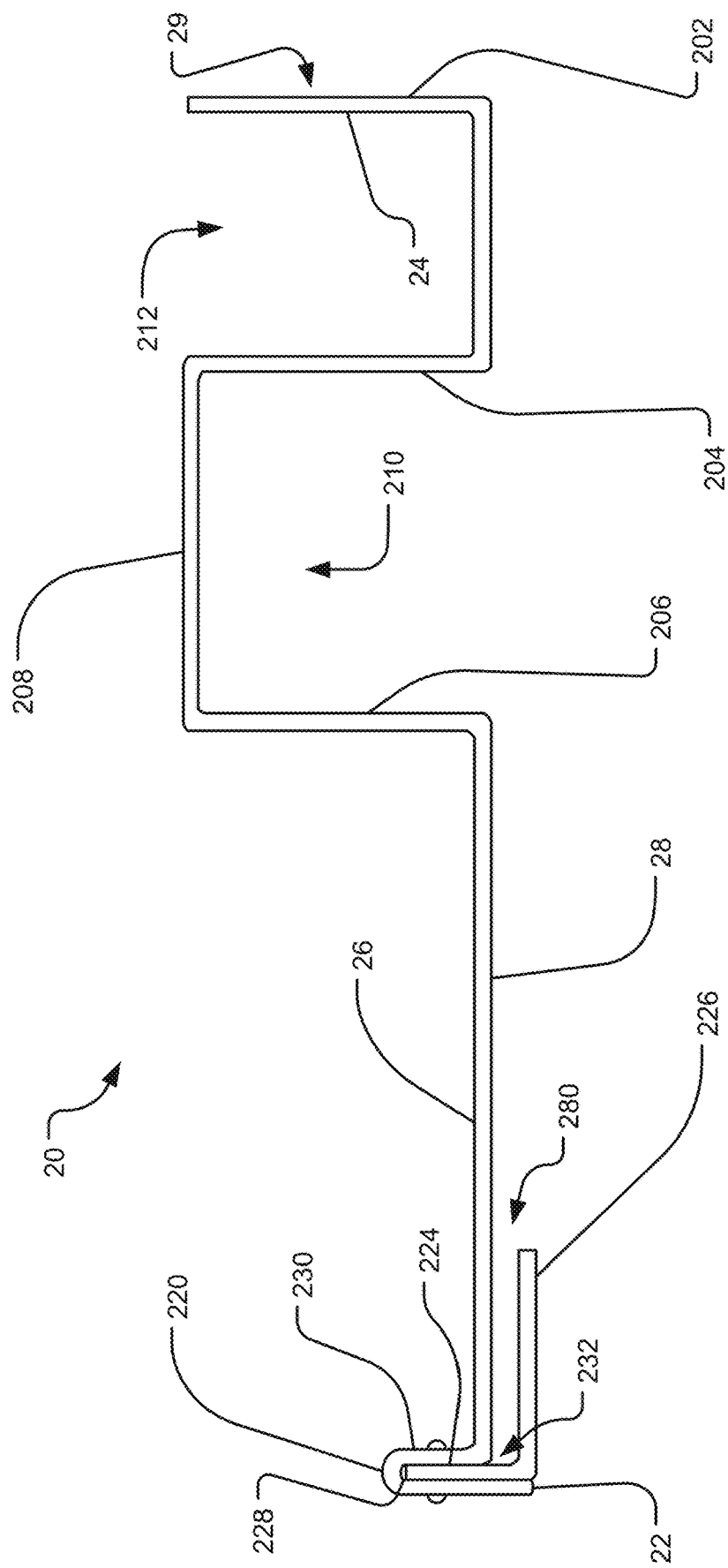
FIG. 2A is an enlarged side view of a first strap of the panelboard guard assembly.
Figure 2B:
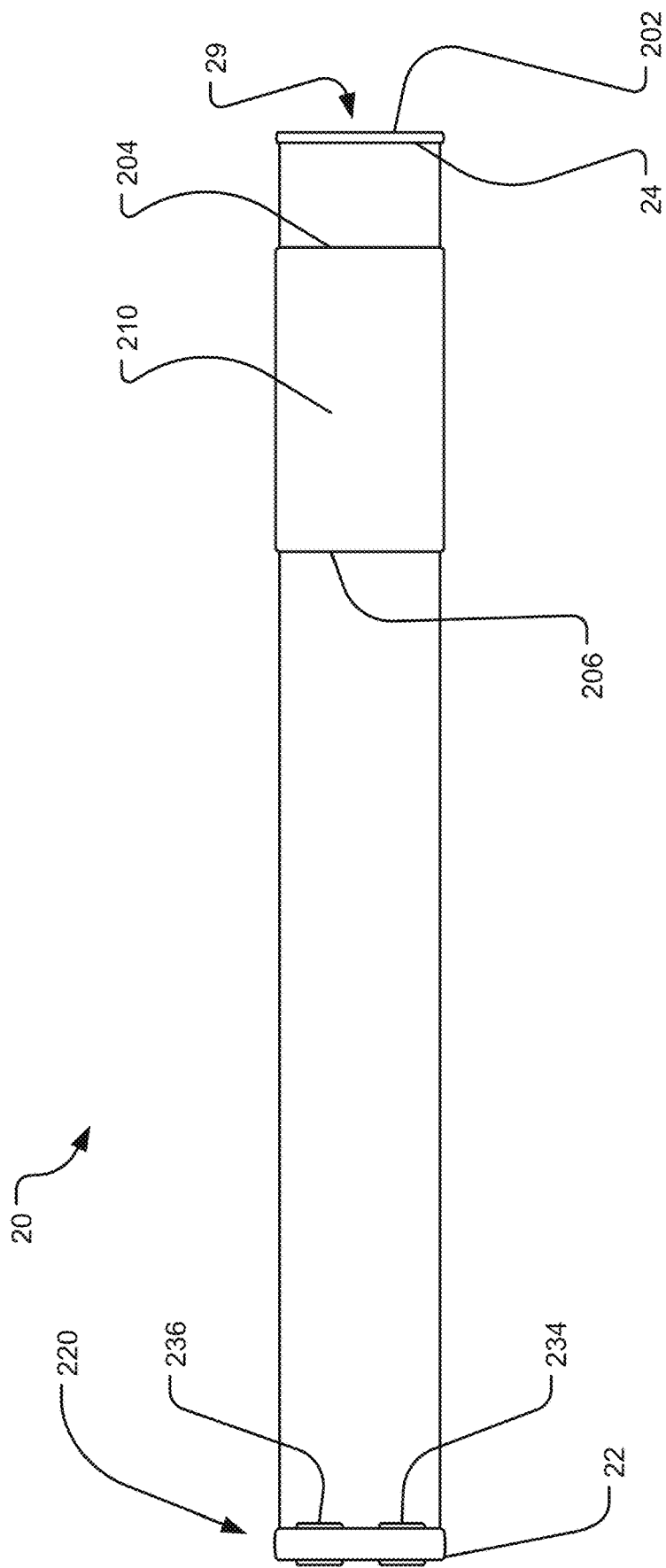
FIG. 2B is an enlarged top plan view of the first strap of the panelboard guard assembly.
Figure 3A:
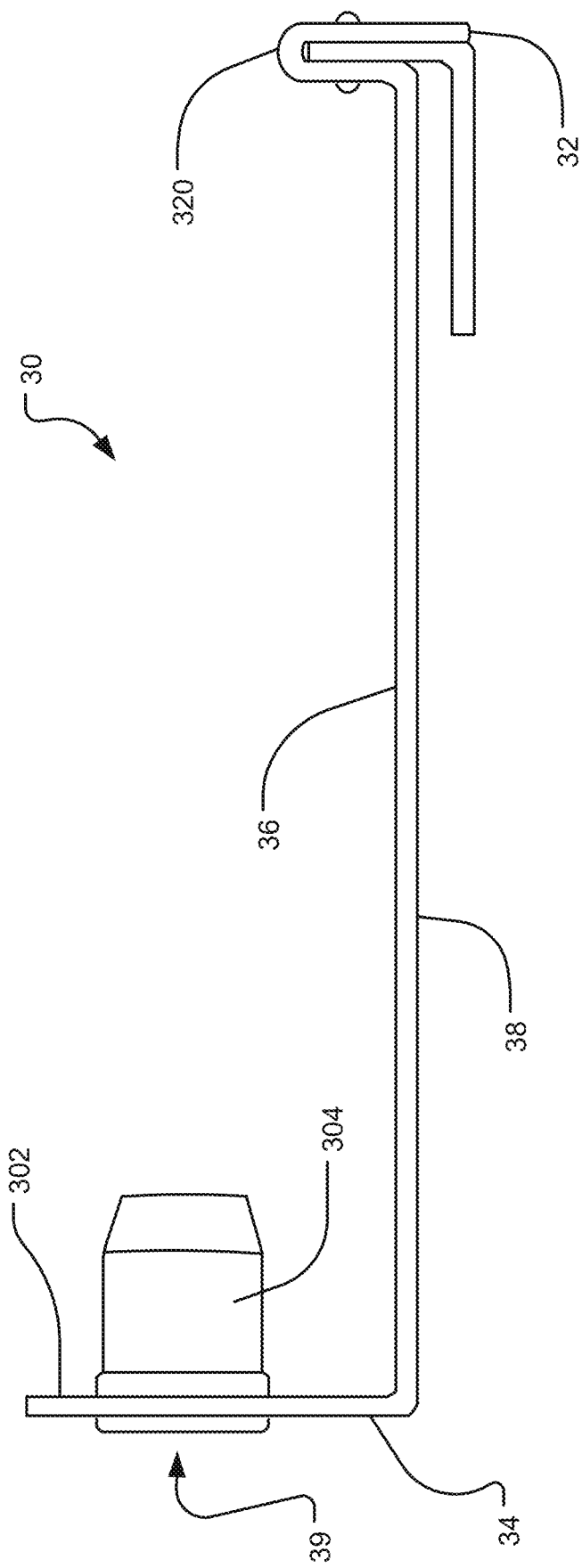
FIG. 3A is an enlarged side view of a second strap of the panelboard guard assembly.
Figure 3B:
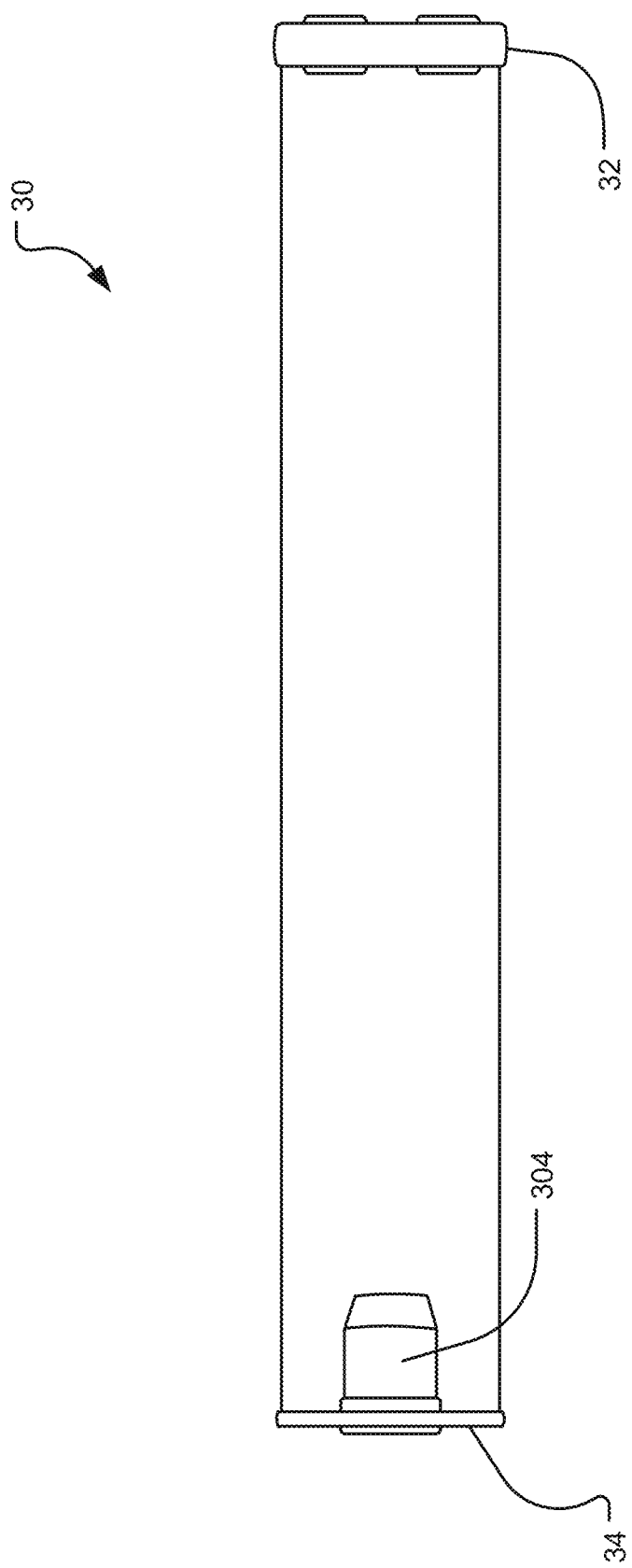
FIG. 3B is an enlarged top plan view of the second strap of the panelboard guard assembly.

FIGS. 2A and 2B are, respectively, enlarged side and top plan views of the first strap 20, and FIGS. 3A and 3B are, respectively, enlarged side and top plan views of the second strap 30. As shown in FIGS. 2B and 3B, the straps 20 and 30 are made from an essentially rectangular shaped material and, once in their final configuration, are substantially of the same length. According to one embodiment, the material can be a 16 gauge sheet metal. However, it should be understood that any other sheet metal or materials, such as, for example, plastics, fibers, etc., that are suitable for forming a locking strap assembly as disclosed herein may be used.

In one embodiment, the width of the straps can be, for example, approximately 1 inch and the length of the straps can vary in order to accommodate for differences in panelboard sizes. According to one embodiment, the length of each strap 20, 30 in its final configuration can be about 9⅞ inches. Also, because the panelboard guard assembly is designed to be used as a safety device it should be easily noticeable. Accordingly, the panelboard guard can be powder coated or painted in a color such as, for example, yellow. However, any other color that will make the panelboard guard easy to detect can be used.

The discussion will now turn to the structure of the first strap 20 shown in FIGS. 2A-2E. As discussed above, according to one embodiment the strap 20 can be made from a rectangular shaped strip of material. As shown in FIGS. 2A and 2B, the strap 20 has an outer first end 22 and an inner second end 24 opposite and spaced apart from the outer first end. The strap 20 also includes and a top surface 26 and a bottom 28 surface. The outer first end 22 includes a wrap-around mounting structure 220 that allows the structure 220 to attach the panelboard guard 10 to the panelboard cover.

Located at the inner second end 24 of the strap 20 is an integrated vertically extending side wall 202 in which an aperture 29 for accepting a threaded member 42 of the adjusting mechanism 40 is formed. As shown in FIG. 2C, the aperture 29 is essentially centered in the vertically extending side wall 202. According to one embodiment, the height of the vertically extending side 202 wall can be approximately 1¼ inches and the width approximately 1 inch. The centerline of the aperture 29 is located at approximately ½ inch from both the top edge 207 and side edge 209 of the vertically extending side wall 202. The aperture diameter may be approximately ⅜ inch.

As illustrated in FIG. 2A, spaced from the vertically extending side wall 202 is an inverted U-shaped structure 210 that includes a pair of vertically extending sidewalls 204 and 206 and an upper wall 208. In other words, the material from which the strap 20 is constructed is shaped so as to form two adjoining U-shaped structures 210 and 212 that share one of the side walls 204. According to one embodiment, the width of the first U-shape structure 212 or the distance between the vertically extending side wall 202 and vertically extending side wall 204 can be approximately equal to 1 inch, and the width of the second, inverted U-shape structure 210, or the distance between the vertically extending side wall 204 and vertically extending side wall 206 can be approximately equal to 2 inches.

As indicated in FIGS. 2A and 2D, the wrap around mounting structure 220 includes an L-shaped member 222 having a short portion 224 and a long portion 226. The short portion 224 of the L-shaped member is interposed between an outer wall 228 and inner wall 230 that form a groove 232 at the outer second end 22 of the of the strap 20. The long portion 226 of the L-shaped member forms a cantilever portion that can be inserted behind a panelboard cover such that the panelboard cover is received in a gap 280 defined between the opposed surfaces of the strap bottom surface 28 and the upper surface of the cantilevered portion 226. With the panelboard cover so received in the gap 280, the structure 220 can be said to wrap around the edge region of the panelboard cover when the panelboard guard is used to secure the panelboard.

The wrap around mounting structure 220 may be formed by appropriately bending one of the ends of the rectangular material from which the strap 20 is constructed so the groove 232 is formed and inserting the short portion 224 of the L-shaped member into the groove. The cantilever portion is formed by the long portion of the L-shaped member extending from the groove along, and parallel to, the bottom surface 28 of the strap 20. Because the outer wall 228 of the groove extends below bottom surface 28 of the strap 20, by flushing the cantilever portion with the bottom of the outer wall of the groove, the gap 280 is defined between the bottom surface 28 of the strap and the cantilever portion into which a panelboard cover can be inserted. According to one embodiment, the outer wall of the groove can extend approximately ⅛ of an inch below the bottom surface of the strap, which in turn provides approximately a ⅛ inch gap 280 into which a panelboard cover can be placed. It should be understood, however, that the gap 280 between the bottom surface of the strap and the cantilevered portion can be modified in order to accommodate different cover thickness over which the panelboard guard is to be placed.

In some embodiments, the long portion 226 of the L-shaped member 222 is generally rectangular in shape and generally continuous along its extents. Alternatively, as shown in FIG. 2E, which is an isometric view of an embodiment of the L-shaped member 222, the long portion 226 may have a slot or notch 225 defined therein. Such a notched configuration as illustrated in FIG. 2E is advantageous in those instances when there is concern the panelboard cover might be removed in an attempt to defeat the guard assembly 10 by removal of the screws holding the panelboard cover in place to the rest of the panelboard. Specifically, the notch 225 in the long portion 226 of the L-shaped member 222 allows the wrap around mounting structure 220 to be centered over a panelboard screw when the structure 220 receives the edge of the panelboard cover in the gap 280, the shaft of the screw being received in the notch 225 and the bottom surface 28 extending over the screw head so as to prevent the removal of the screw when the guard 10 is used to secure the panelboard.

Figure 7:
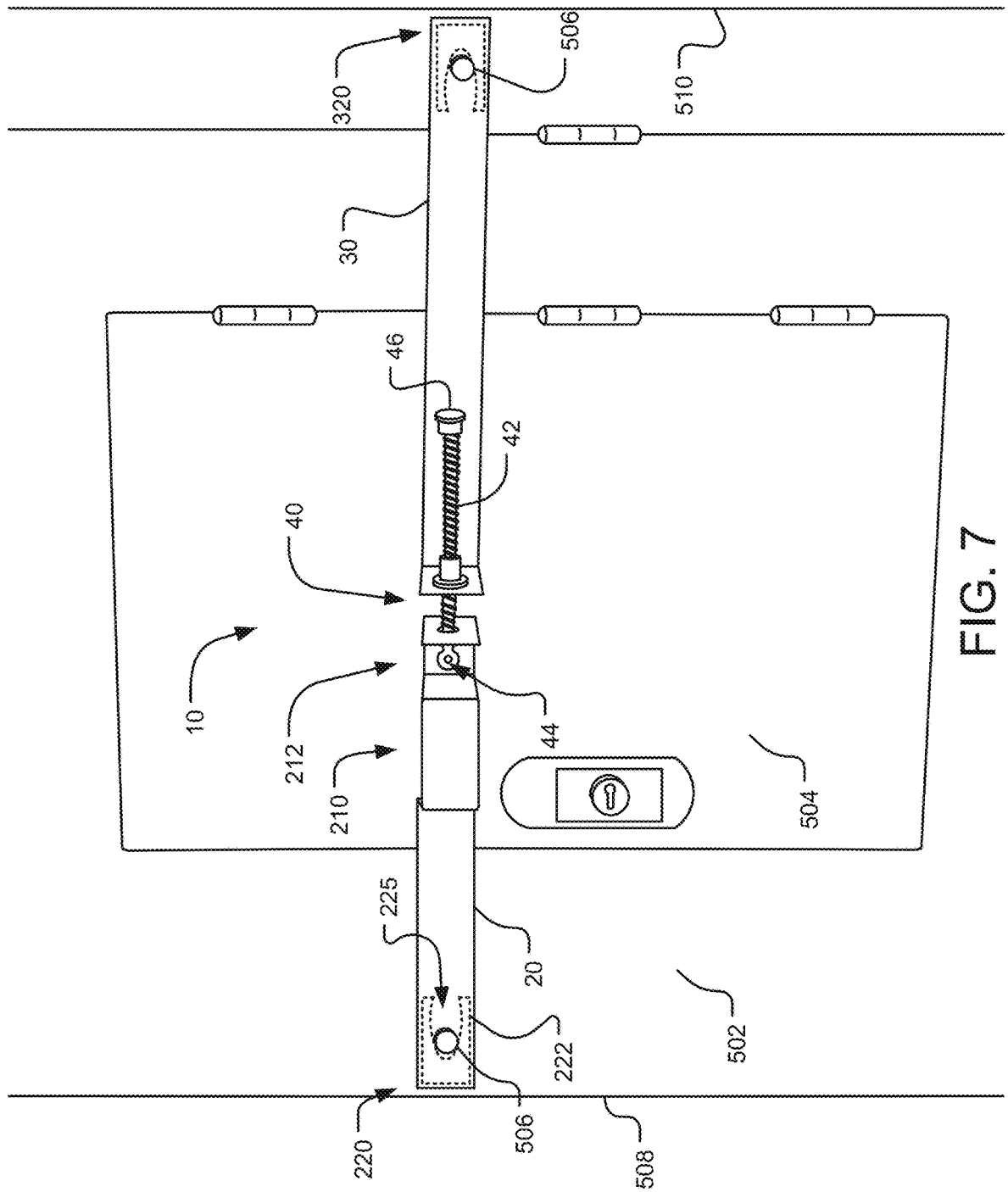
FIG. 7 is a perspective view of the panelboard guard assembly secured to a panelboard via an alternative method.

Alternatively, the notch 225 in the long portion 226 of the L-shaped member 222 can be placed directly behind the screw head located in the front of the panelboard cover as shown in FIG. 7. More specifically, in this configuration the panelboard cover is no longer inserted in the gap 280 created between the long portion of the L-shaped member and the bottom surface of the strap, but instead the long portion of the L-shaped member is flush against the top surface of the panelboard cover with the screw shaft placed in the notch 225 and the screw head received in the gap 280.

As shown in FIGS. 2A, 2B, and 2D, the short portion of the L-shaped member is secured inside the groove by a pair of rivets 234, 236 that are placed in a set of openings formed in both of the groove defining walls 228, 230. According to one embodiment, the holes through which the rivets are placed are approximately ⁵⁄₃₂ inches in diameter, with the centerline located at approximately ¼ inches from both the top edge 237 and the side edge 238 of the groove defining walls. However, it should be understood, that any other form of suitable attachment means can be used to secure the L-shaped member in the groove. As discussed above, because the L-shaped member is meant to wrap around an edge of a panelboard cover and thus might be in contact with electrical components located inside the panelboard, the L-shaped member is preferably constructed from an electrically non-conductive material such as, for example, plastics, polymers, or composites, and can be made from a different material than the material from which the strap is constructed. For example, the straps 20, 30 may be formed of steel, aluminum, plastics, polymers, or composites.

Similarly to the first strap 20, the second strap 30 shown in FIGS. 3A-3C can be made from a rectangular shaped strip of material. The strap 30 also has an outer first end 32 and an inner second end 34 opposite and spaced apart from the outer first end. The strap 30 also includes a top surface 36 and bottom surface 38. At the outer first end is located a wraparound mounting structure 320 similar to the structure 220 described above with respect to FIGS. 2A-2E that allows the strap 30 to attach the panelboard guard 10 to the panelboard cover. As shown in FIGS. 3A-3C, at the inner second end 34 is a vertically extending side wall 302 with an aperture 39 that includes a threaded insert 304 through which the threaded member 42 of the adjusting mechanism 40 can threadably displace. According to one embodiment, the vertically extending side wall 302 can be approximately 1¼ inch in height and 1 inch in width, with the centerline of the aperture placed at approximately ½ inch from both the upper edge 306 and side edge 308 of the vertically extending side wall. In one embodiment, the threaded insert 304 is secured in the aperture 39 via an interference fit or welding.

Figure 4:
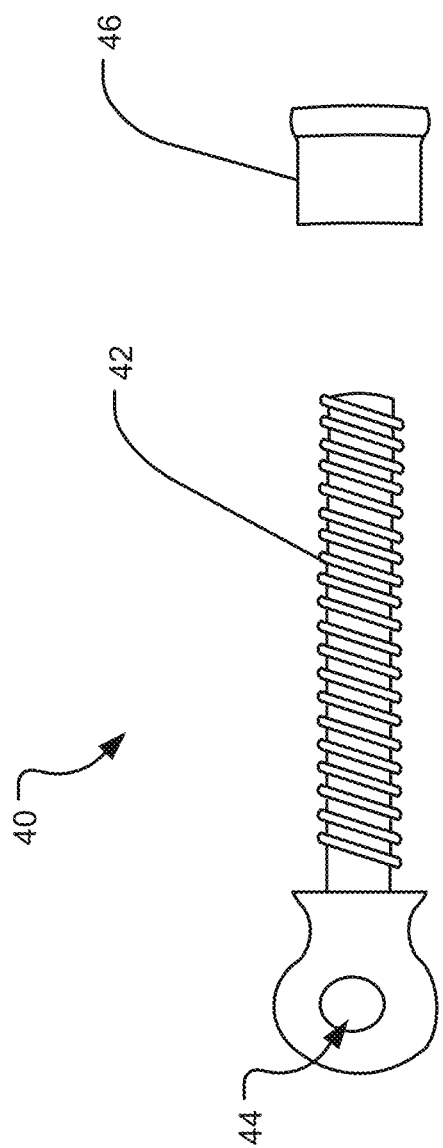
FIG. 4 is an enlarged side view of an adjusting mechanism.

Now the discussion will turn to the adjusting mechanism 40 located in the center of the panelboard guard 10. As shown in FIG. 4, which is an enlarged side view of the adjusting mechanism 40, the adjusting mechanism includes a threaded member 42 and an Allen nut 46. The threaded member, according to one embodiment, can be an eye bolt having a hole 44 in the handle at one end for accepting PPE locking devices. Accordingly, the hole of the eye bolt is sized such that any of the conventional lockout or tag-out devices can be placed through the hole. The Allen nut 46 is attached to the other end of threaded member located at the end opposite the hole once the panelboard guard is assembled as shown in FIG. 1. In particular, once the threaded member is inserted through the aperture 29 in the side wall 202 of the strap 20 and screwed through the threaded rivet 304 in the side wall 302 of the strap 30, the allen nut is fused to the threaded member using such techniques as for example welding, mechanical crimping, adhesives, etc. in order to ensure that the panelboard guard cannot be disassembled or tampered with while the panelboard guard is being used.

For a discussion of how the above-discussed elements are assembled together in the panelboard guard device 10, reference is once again made to FIG. 1. As shown in FIG. 1, the straps 20 and 30 are placed adjacent to each other. More specifically the inner ends 24 and 34 of the straps 20 and 30 are placed next to each other in an end to end configuration. The threaded member 42 of the adjusting mechanism 40 is then placed through the opening 29 in the vertically extending sidewall 202 of the strap 20 and threaded through the threaded rivet 304 in the vertically extending sidewall 302 of the strap 30 with the hole 44 for accepting the PPE locking devices located within the first U-shaped structure 212 of the strap 20. Orienting the threaded member such that the opening 44 is located between the vertically extending sidewalls 202 and 204 prevents disassembling or tampering with the panelboard guard once it is secured to a panelboard cover via the wrap around structures 220, 320 engaging opposite edges of the panelboard cover and a PPE locking device secured through the hole 44. In other words, because the end of the threaded member with the opening 44 is confined within the first U-shaped structure 212, once a locking device is placed in the opening 44 of the threaded member, the adjusting mechanism 40 can no longer be rotated relative to the straps 20, 30 and, as a result, the panelboard guard 10 cannot be disassembled or adjusted with respect to its overall length. This insures that the panelboard guard cannot be inadvertently removed or tampered with.

The discussion will now turn to a method of employing the panelboard guard 10 to secure a panelboard. FIGS. 5A-5C and FIG. 7 are perspective views of a panelboard 500 with a panelboard guard 10 attached to it. As shown in FIGS. 5A-5C and FIG. 7 a panelboard 500 includes a panelboard cover 502 and panelboard access door 504. The panelboard cover is attached to the panelboard with screws 506. According to one embodiment, the panelboard guard 10 can be placed horizontally across the face of the panelboard in an area that will cross and capture the access door 504 of the panelboard to be secured. More specifically, the wrap around mounting structures 220 and 320 are first wrapped around the outside edges 508 and 510 of the panelboard cover such that the outside edges 508 and 510 are received in the respective gaps 280 of the structures 220 and 320 and the straps 20 and 30 are caused to extend across the face of the access door 504 and cover 502 such that the bottom surfaces 28 and 38 of the respective straps generally abut the planar surfaces of the access door and cover.

It may be deemed beneficial to protect against the guard 10 being defeated by the removal of the panelboard cover 502 via removal of the screws 506. The guard 10 can be mounted on the panelboard 500 in such a manner as to protect against the guard 10 being defeated by removal of screws. Specifically, the outside edges 508 and 510 of the panelboard cover can be received in the respective gaps 280 with the straps 20 and 30 extending directly over in close proximity to the screw head and the screw shafts being received in the respective notches 225. With the guard 10 so arranged relative to the screws, the screws cannot be rotated outward to any extent that would allow the panelboard cover to be removed.

Alternatively, as shown in FIG. 7, after the screw 506 is loosened, the notch 225 in the long portion of the L-shaped member can be placed around the screw shaft such that the long portion of the L-shaped member is between the top surface of the panelboard cover and the bottom surface of the screw head.

With the guard 10 so engaged with the panelboard cover, the adjusting mechanism 40 is tightened by threading threaded member 42 through the threaded insert 304 so as to bring the opposed faces 29 and 39 of the respective straps 20 and 30 closer together, thereby shortening the overall length of the guard 10 between its opposite ends 12 and 14 in order to pull the straps 20 and 30. By pulling the straps 20 and 30 together in such a manner, the panelboard cover edges 508 and 510 are caused to be deeply received in the respective wrap around structures 220 and 320, thereby preventing the guard 10 from being removed from the panelboard cover and preventing the panelboard access door from being opened. In other words, the panelboard guard is secured across the panelboard by first securing the first and second end 12 and 14 of the panelboard guard under the outside edges of the panelboard cover using the wrap around mounting structures 220 and 320. The straps are then pulled together by threading the threaded member 42 through the threaded insert 304 such that the eyebolt opening 44 is caused to move towards the threaded member 42, thereby bringing the planar faces 29 and 39 towards each other.

Figure 5A:
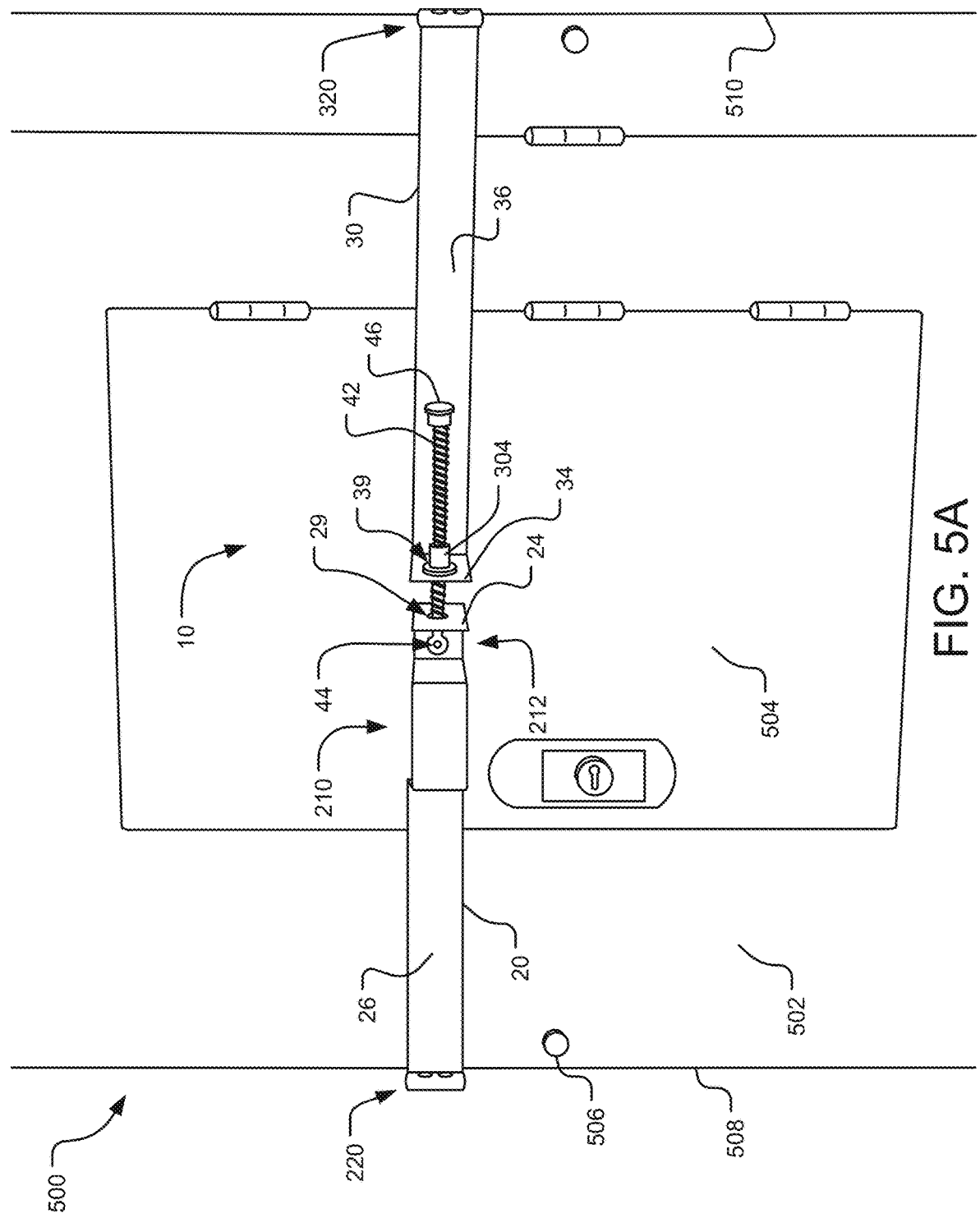
Figure 5B:
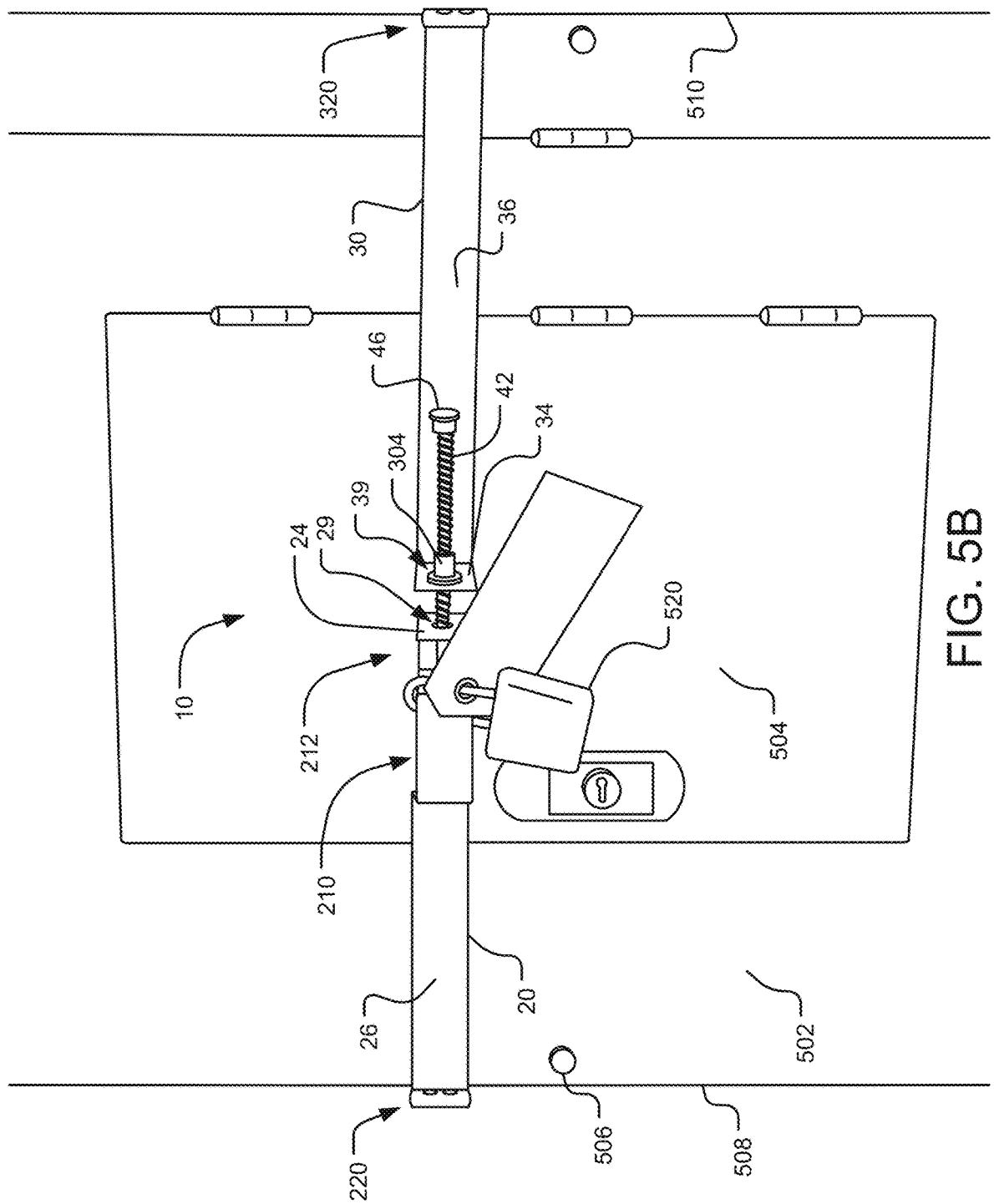

As shown in FIGS. 5B and 5C, once the panelboard guard is securely attached to the panelboard cover, different types of PPE lockout and or tag-out devices can be used to prevent tampering with or disassembling of the panelboard guard and thus ensure that the access to the panelboard and/or the circuit breakers inside the panelboard is restricted. For example, one such lockout/tagout device can include a simple padlock with a padlock 520 as shown in FIG. 5B or a safety lockout hasp 530 for multi-users as shown in FIG. 5C. In either case, the lockout device has a portion that extends through the hole 44 in the eyebolt end of the adjusting mechanism 40 and through both the outward projecting U-shaped region 212 and the inward projecting U-shaped region 210. Because the lockout device extends through the hole 44 and the first strap 20 extends through the lockout device on account of the lockout device also extending through both U-shaped regions 210 and 212, the lockout device cannot be caused to rotate relative to the first strap 20 and the adjustment mechanism 40 cannot be caused to rotate relative to the first strap 20 or second strap 30, thereby preventing adjustment of the overall length of the guard 10 and its unapproved removal from panelboard cover.

Figure 6:
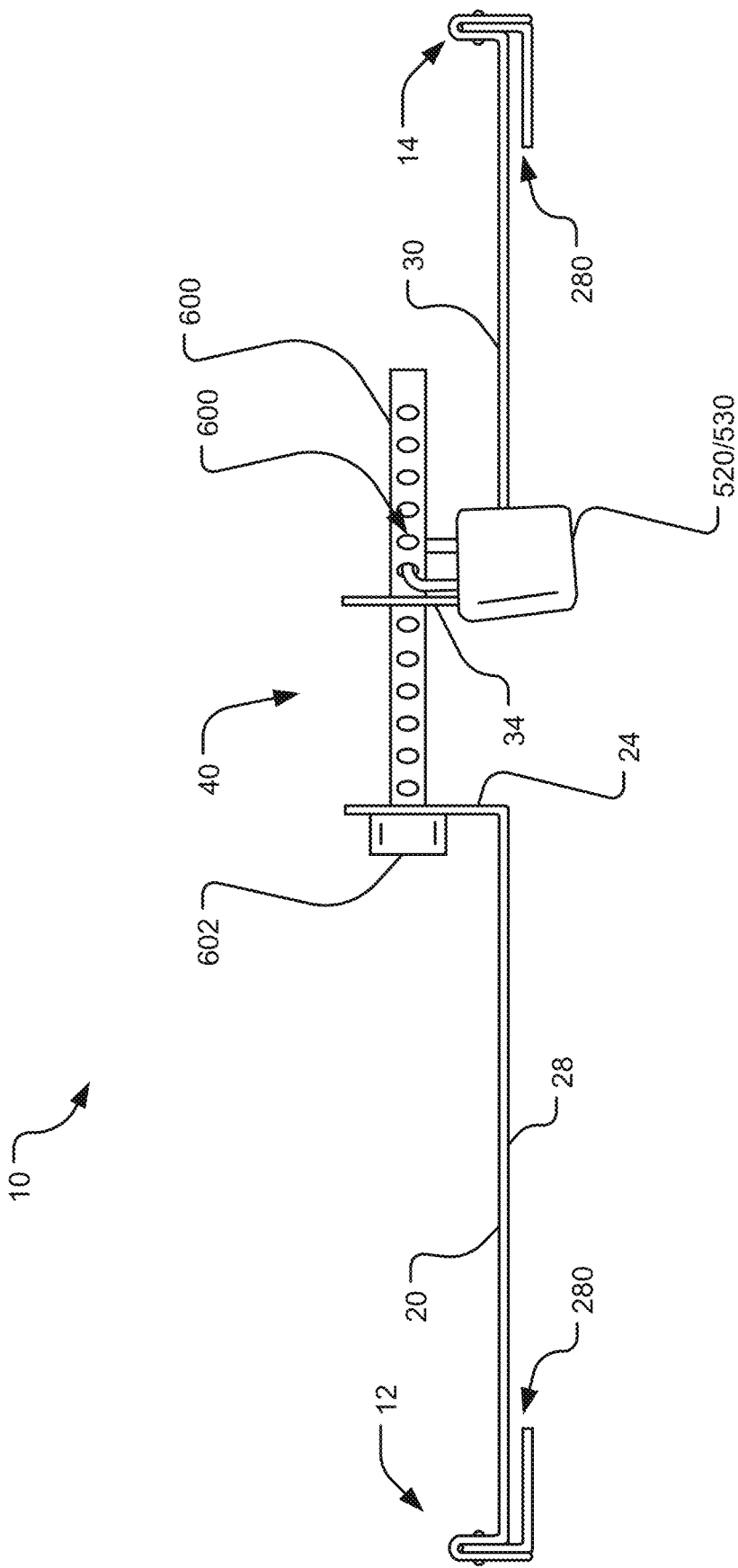
FIG. 6 is a side view of a panelboard guard assembly employing another type of adjusting mechanism.
Figure 8:
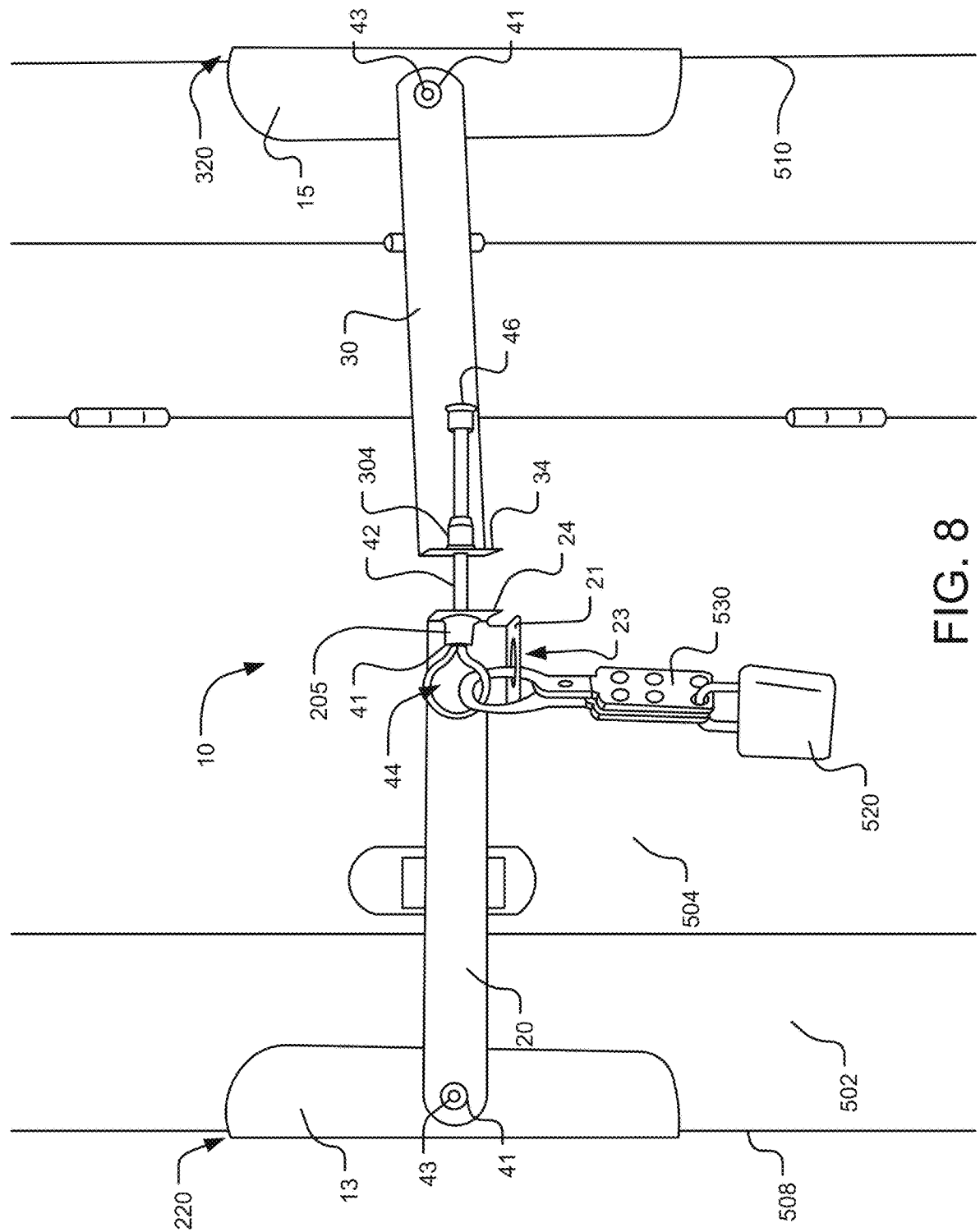
FIG. 8 is a perspective view of the panelboard guard assembly with pivotable end members and an alternative configuration for the first strap.

FIGS. 6 and 8 illustrate a design for a panelboard guard assembly 10 without the U-shaped regions 210 and 212 on the first strap 20. The first strap 20 is generally flat, with the strap bottom surface 28 extending continuously and uniformly from the first outer end 12 to the inner second end 24. As shown in FIG. 8, the first strap 20 includes a tab 21 with an aperture 23 for receiving a lockout/tagout device. The tab 21 is positioned in a general area where the outwardly projecting U-shaped region 212 was located in FIG. 2A. The tab 21 is positioned substantially perpendicular to both the top surface 26 and the inner second end 24 of the first strap 20. The size of the aperture 23 and the location of the tab 21 on the first strap 20 are such that a safety lockout padlock 520 or a safety lockout hasp 530 can extend through the aperture 23 and an eyebolt opening 44.

The adjustment mechanism in FIG. 8 includes a threaded member 42 with an opening 44, a fiber washer 41, and a non-threaded rivet nut, bushing or spacer 205 on the first strap 20. The fiber washer 41 (hidden inside the non-threaded rivet nut 205) mitigates contact between the eyebolt portion 44 of the threaded member 42 and the non-threaded rivet nut 205, and the non-threaded rivet nut provides a smooth bearing surface for the threaded member 42 to rotate. The non-threaded rivet nut 205 can be riveted, welded, or otherwise fastened to the inner second end 24 of the first strap 20. On the inner second end 34 of the second strap 30, the threaded member 42 is threadably received by a threaded insert 304, which can be a threaded rivet or similar device. As in FIG. 1 and other figures, the threaded member 42 can include an Allen nut 46. In the FIG. 8 orientation, when the threaded member 42 is tightened, the first and the second straps 20 and 30 are pulled together. When the threaded member 42 is tightened sufficiently, so that the panelboard guard 10 is secured across the panelboard, the safety lockout padlock 520 or hasp 530 can extend through the aperture 23 of the tab 21 and the eyebolt opening 44 and lock accordingly. Similarly to embodiments with the U-shaped regions 210 and 212, when the lockout device 520 or 530 extends through both the eyebolt opening 44 and a portion of the first strap and is locked, the threaded member 42 cannot be loosened.

In FIG. 8, the outer ends 12 and 14 include pivotable end members 13 and 15 that are pivotably coupled to the straps 20 and 30 by shoulder rivets 43. The shoulder rivets 43 allow the end members 13 and 15 to rotate while still maintaining a secure connection between the end members and the straps 20 and 30. Additionally, fiber washers 41 can be used between the straps 20 and 30 and the end members 13 and 15. The pivotable end members 13 and 15 include relatively large contact surfaces between the outer ends 12 and 14 and the panelboard 508 and 510. The end members 13 and 15 can rotate so that each end member is substantially parallel to the straps 20 and 30. As a note, the wrap around mounting structures 320 and 220 that attach the outer ends 12 and 14 to the panelboard 508 and 510 need not be altered when the outer ends include the pivotable end members.

The panelboard assembly 10, in FIG. 8, can be straightened for storage, shipping, etc. by rotating the end members so that each is parallel to the straps 20 and 30, and positioning the straps 20 and 30 parallel to each other. The end members 13 and 15 can each be secured in the parallel orientation with the straps 20 and 30. Additionally, the pair of straps 20 and 30 with parallel end members 13 and 15 can be secured together for ease of handling and shipping. Once the panelboard assembly 10 is straightened, as described above, the straps 20 and 30, along with the parallel oriented end members 13 and 15, can be placed in a container for either storage or shipping. The panelboard assembly 10, in FIG. 8, can fit inside a 2.5"×27" tube for convenient storage or shipping.

To remove the guard 10 from the panelboard cover, the lockout device is removed from the guard and the above-described installation method is reversed, including reversing the rotation of the threaded member 42 relative to the threaded insert 304 such that the distance between the hole 44 and the threaded insert 304 increases. Such rotation of the threaded member increase the overall length of the guard 10 and allows the wrap around structures 220 and 320 to be disengaged from the respective panelboard cover edges 508 and 510, thereby allowing the guard 10 to be removed from the panelboard and the panelboard access door 504 to be opened.

While the discussion given above with respect to FIGS. 1-50 is given in the context of the guard 10 employing an adjustment mechanism 40 having a threaded arrangement, in other embodiments, the adjustment mechanism 40 may have other arrangements. For example, in one embodiment, the adjustment mechanism 40 may be in the form of a lever operated ratchet mechanism or a cable/pulley operated come-along mechanism. In other embodiments, as illustrated in FIG. 6, adjustment mechanism 40 may be in the form of a bolt shaft 600 with a bolt head 602 at one end of the shaft and a series of holes 605 located along the shaft and spaced apart from each other in an incremental arrangement. The holes are sized such that at least one of a safety lockout padlock 520 or a safety lockout hasp 530 can extend through the holes. Once the outer ends 12 and 14 are attached to the respective edges 508 and 510 of the panelboard cover 502, the shaft 600 can be positioned relative to the two inner ends 24 and 34 so the overall length of the guard 10 is sufficiently short so as to keep the edges 508 and 510 securely received in the gaps 280 with no slack in the overall length of the guard 10. The padlock 520 or hasp 530 can then be passed through the specific hole that is closest to the inner end 34 with the bolt head 602 abutting against the inner end 24, as can be understood from FIG. 6.

Figure 9:
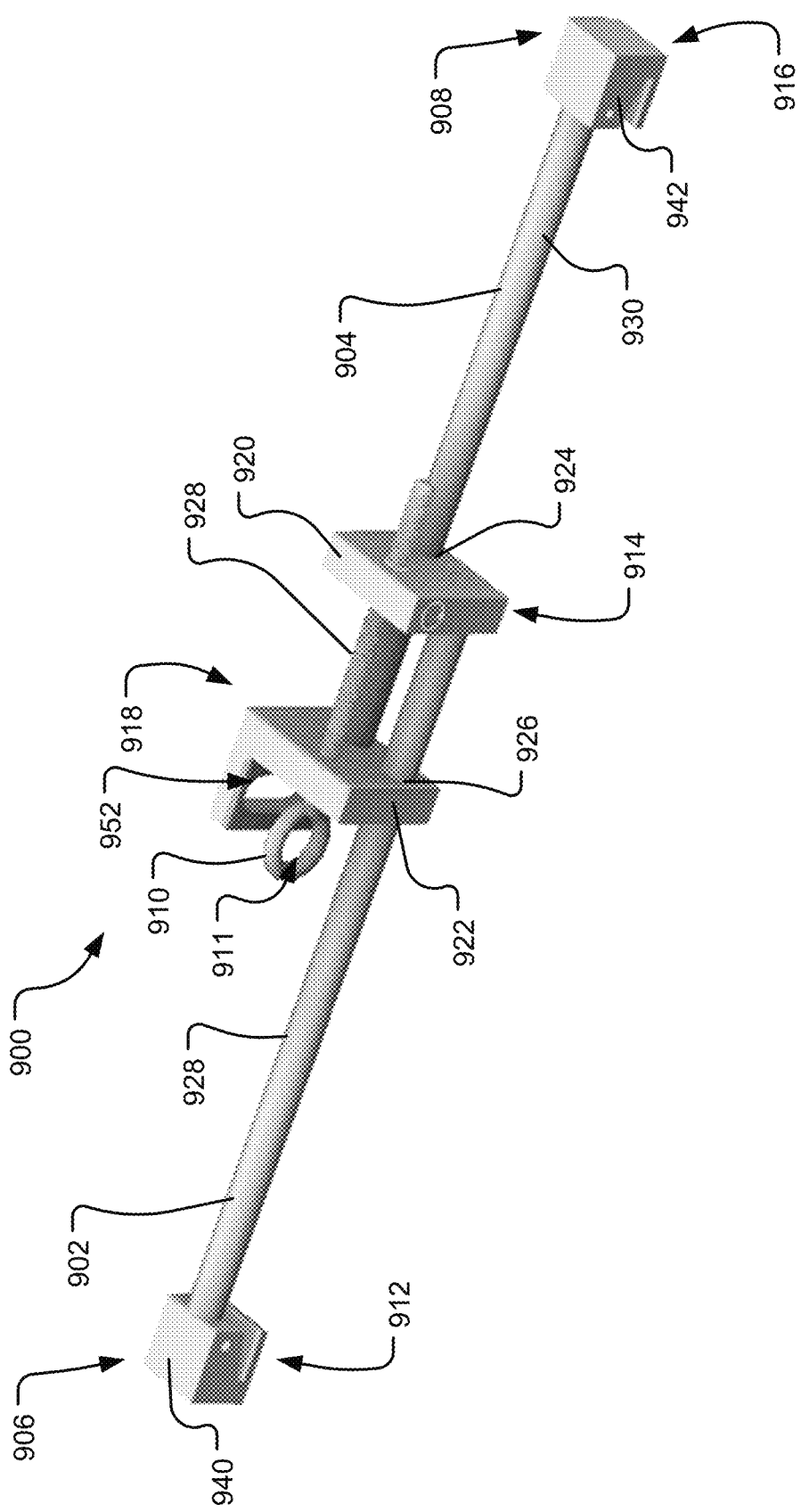
FIG. 9 is a perspective view of another panelboard guard assembly in accordance with the present disclosure, the panelboard guard assembly including slidable, coupled members.
Figure 10A:
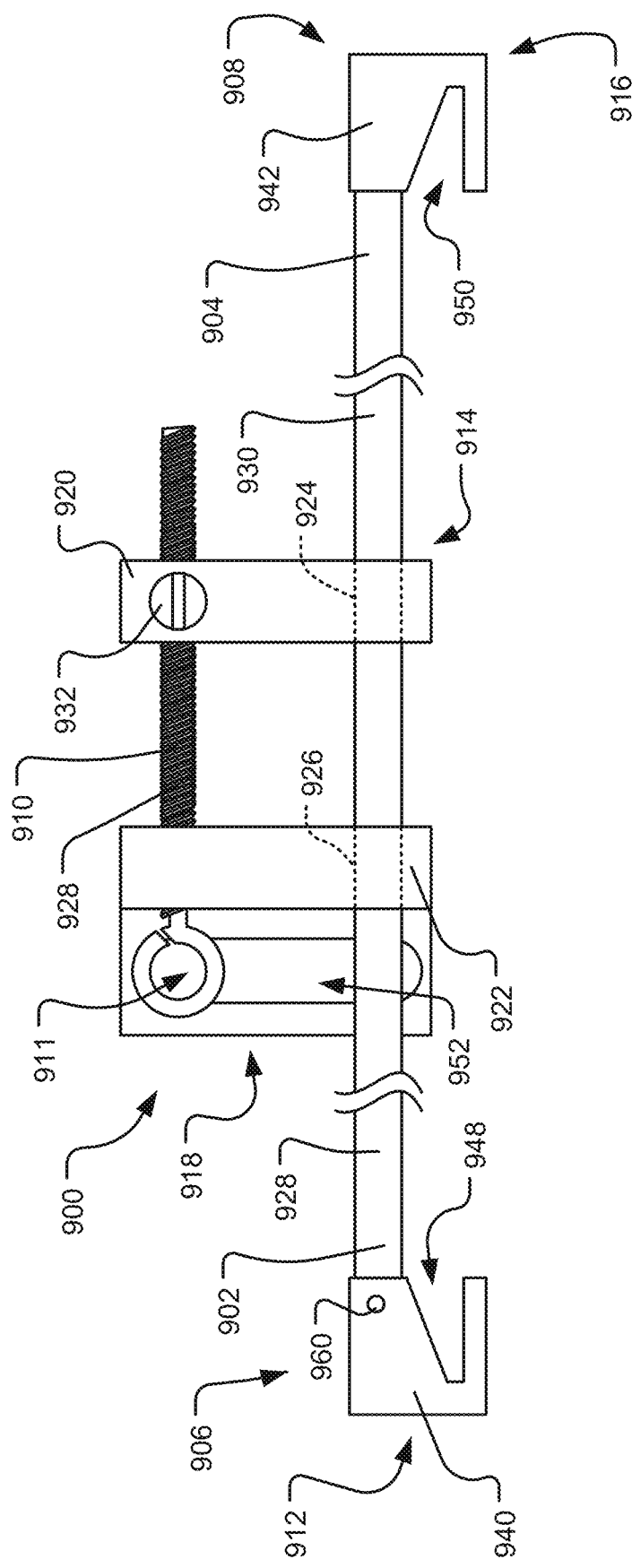
FIGS. 10A-10B are plan and side elevation views, respectively, of the guard of FIG. 9.
Figure 10B:
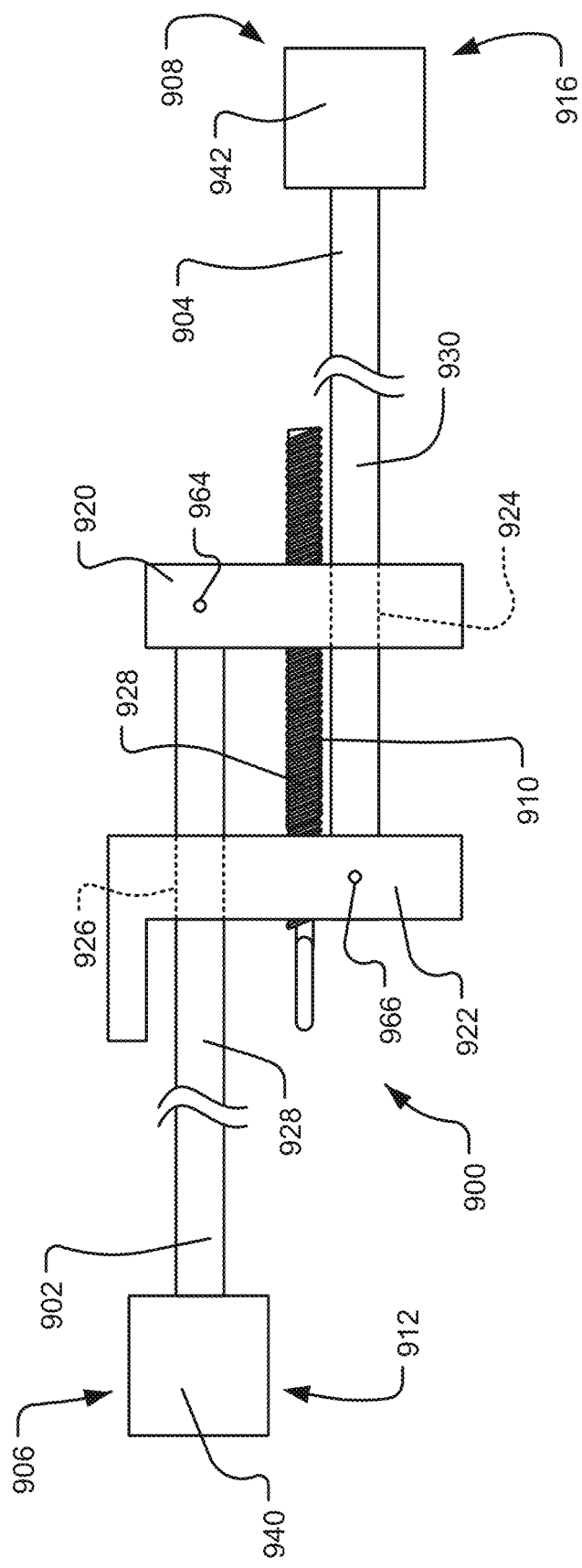
Figure 11:
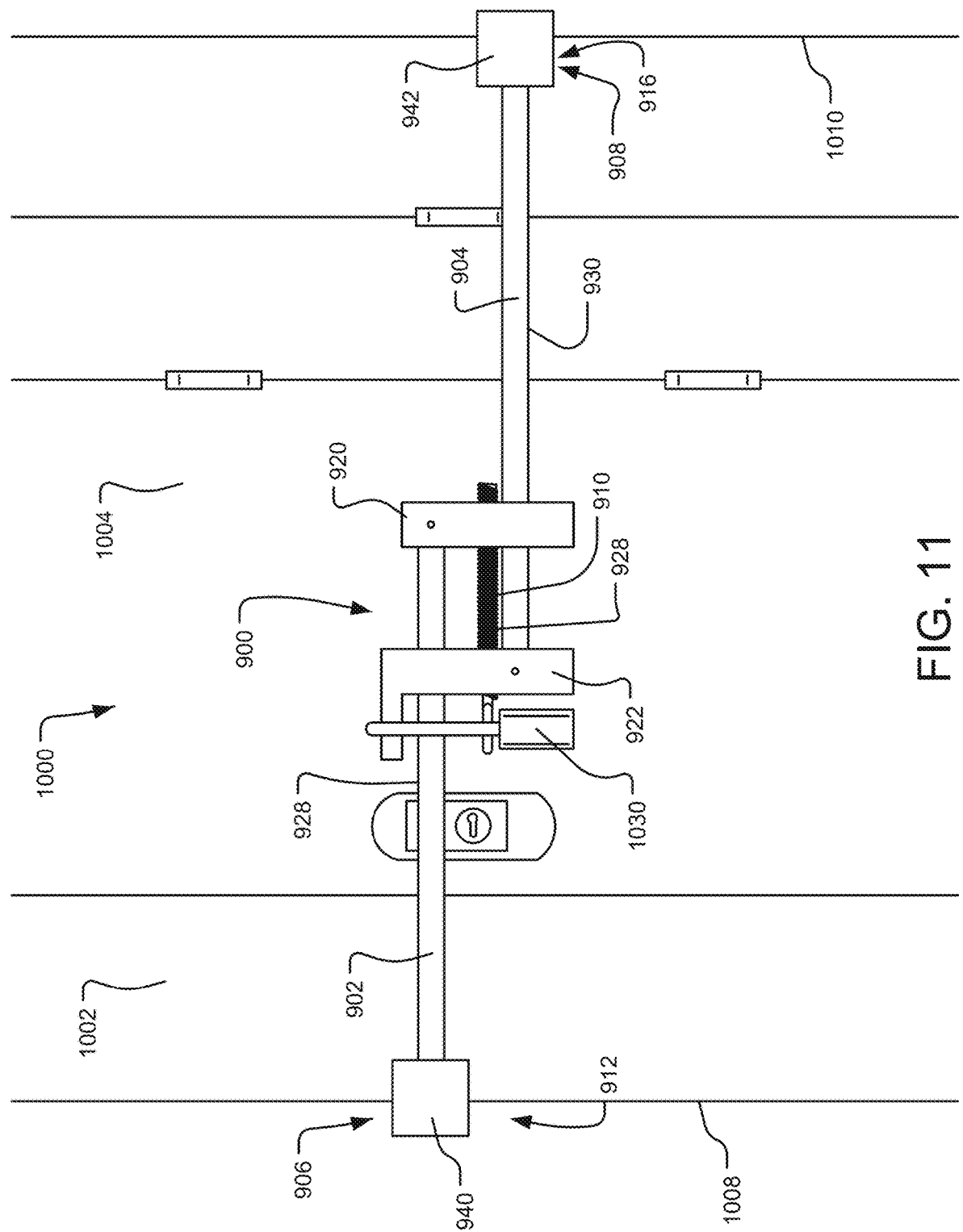
FIG. 11 is a view of the panelboard guard of FIG. 9 secured to a panelboard.

FIGS. 9-11 illustrate another panelboard guard assembly 900 in accordance with the present disclosure. More specifically, FIG. 9 is a perspective view of the panelboard guard assembly 900, FIGS. 10A-10B are a bottom view and a side elevation views, respectively, of the panelboard guard assembly 900, and FIG. 11 illustrates the panelboard guard assembly 900 in use to prevent access to a panelboard.

As shown in FIGS. 9-10B, the panelboard guard assembly 900 includes a pair of members 902, 904 having a first end 906 and a second end 908, the second end 908 being spaced apart from the first end 906. The panelboard guard assembly 900 further includes an adjustment mechanism 910 extending between the members 902, 904. Similar to the previously discussed and illustrated implementations of FIGS. 1 and 6, in which the members 20, 30 were coupled by the adjustment mechanism 40, the adjustment mechanism 910 extends between the members 902, 904 and may be used to adjust the spacing between the first end 906 and the second end 908. In the illustrated implementations, for example, the adjustment mechanism 910 is an eyebolt that may be rotated to change the displacement between the first end 906 and the second end 908.

In certain implementations, the members 902, 904 may be approximately the same length; however, the members 902, 904 may also vary in length to accommodate different panelboard arrangements. Each member 902, 904 is generally defined by a respective outer end and a respective inner end. For example, the first member 902 includes an outer end 912 and an inner end 914 and the second member 904 includes an outer end 916 and an inner end 918 such that, when assembled, the outer end 912 of the first member 902 generally corresponds to the first end 906 of the panelboard guard assembly 900 and the outer end 916 of the second member 904 generally corresponds to the second end 908 of the panelboard guard assembly 900.

The inner end 914 of the first member 902 and the inner end 918 of the second member 904 each include respective end structures, which are generally referred to herein as end blocks 920, 922 and which are configured to, among other things, couple the members 902, 904 together. More specifically, the second member 904 extends through an aperture 924 of the first end block 920, which is coupled to the inner end 914 of the first member 902. Similarly, the first member 902 extends through an aperture 926 of the second end block 922, which is coupled to the inner end 916 of the second member 904. As a result, the first member 902 and the second member 904 at least partially overlap and the end blocks 920, 922 are disposed such that they are between the inner and outer ends of the opposite member. Although the first block 920 and the second block 922 constrain the second member 904 and the first member 902, respectively, each member 902, 904 is able to slide in an inward/outward direction relative to each other such that the overall length of the panelboard guard assembly 900 may be changed (e.g., by manipulating the adjustment mechanism 910 or, if the adjustment member 910 is removed, by simply pushing or pulling on the members 902, 904).

Figure 12:
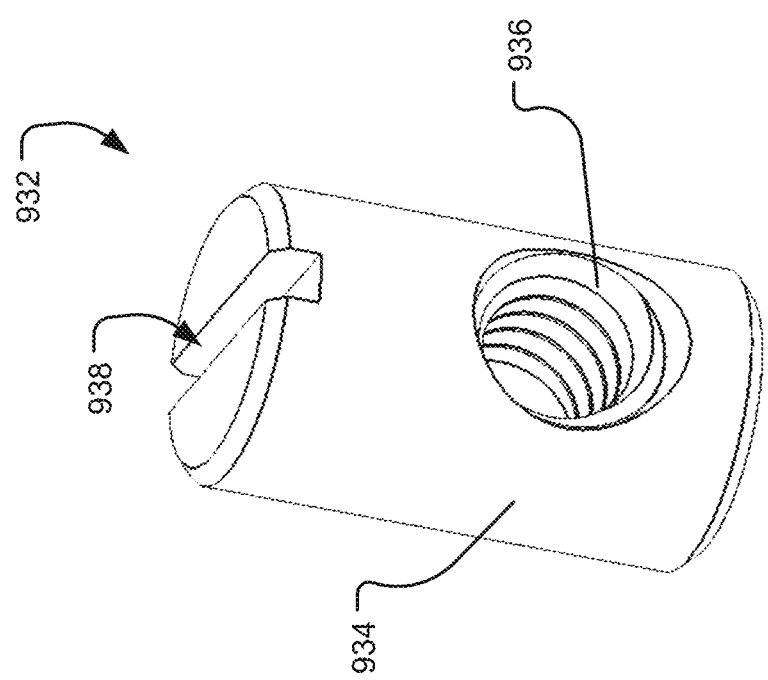
FIG. 12 is an isometric view of a barrel nut for use in the panelboard guard assembly of FIG. 9.

As illustrated in FIGS. 10A-10B, the adjustment mechanism 910 may be located at or near the center of the panelboard guard assembly 900 so as to extend through each of the first end block 920 and the second end block 922. In FIG. 10A, for example, the adjustment mechanism 910 includes a threaded member 928 extends through the second end block 922 and is received by the first end block 920, which generally includes a threaded surface configured to engage the threaded member 928. In certain implementations, the threaded surface may be formed in the end block 920; however, in the illustrated implementation, the threaded surface is provided by a barrel nut 932 (shown in FIG. 10A) or similar insert disposed within the end block 920. FIG. 12 is an isometric view of the barrel nut 932. As shown, the barrel nut 932 may include a cylindrical body 934 (or other shaped body insertable into the end blocks 920) through which a threaded hole 936 extends. The barrel nut 932 may also include a slot 938 or similar feature to facilitate placement and alignment of the barrel nut 932 within the end block 920. Accordingly, when disposed within the end block 920, the threaded hole 936 of the barrel nut 932 may be aligned to receive the threaded member 928.

In the specific implementation of FIGS. 9-11, each of the members 902, 904 includes a respective rod 928, 930 that extends through the end block of the opposite member. For example, the first member 902 includes a rod 928 that extends through an aperture 926 of the second end block 922 to couple with the first end block 920. Similarly, the second member 904 includes a rod 930 that extends through an aperture 924 of the first end block 920 to couple with the second end block 922. Although other coupling mechanisms and techniques may be used, the specific implementation of FIGS. 9-11 includes spring pins 964, 966 for coupling each of the rods 928, 930 to its respective end block 920, 922. The rods 928, 930 and apertures 924, 926 are shown as having a similar circular shape such that the rods 928, 930 may slide through the apertures 924, 926; however, in other implementations, the apertures 924, 926 and rods 928, 930 may have cross-sectional shapes that are other than circular provided that each rod 928, 930 is extendable through and is slidable within its corresponding aperture.

The outer end of each member 902, 904 generally includes a respective mounting structure 940, 942 for attaching the panelboard guard assembly 900 to a panelboard cover. More specifically, the outer end 912 of the first member 902 includes a first mounting structure 940 and the outer end 914 of the second member 904 includes a second mounting structure 942. Each of the mounting structures 940, 942 may be coupled to its respective rod 928, 930 using various methods. As illustrated in FIG. 10A, for example, each mounting structure 940, 942 is coupled to its respective rod 928, 930 by a respective spring pin, such as spring pin 960 for mounting structure 940 (the spring pin for mounting structure 942 being directed away from the view of FIG. 10). When in use, at least a portion of each of the mounting structures 940, 942 extends around a respective outer edge of the panelboard to attach the panelboard guard assembly 900 to the panelboard (such as illustrated in FIG. 11 and discussed below in further detail). Accordingly, each mounting structure 940, 942 may include a slot 948, 950 (or similar receiving structure, such as a channel) within which the outer edge of the panelboard is received.

One of the end blocks 920, 922 may define a slot, hole, or similar aperture 952. As discussed below and illustrated in FIG. 11, the aperture 952 is generally provided to facilitate locking out/tagging out of a panelboard. More specifically, the aperture 952 is positioned such that a lockout/tag-out device (e.g., a hasp or padlock) can be readily inserted through each of a portion of the adjustment mechanism 910 (here, an eye 911 of the adjustment mechanism 910) and the aperture 952. For example, when a padlock is used as a lockout/tag-out device, the shank of the padlock may be passed through each of the eye 911 and the aperture 952 before being inserted into the padlock body to lock the padlock. Similarly, in another application, the jaws of a lockout hasp may be inserted through each of the eye 911 and the aperture 952 before closing the jaws and locking the hasp.

In one particular implementation, the panelboard guard assembly 900 is assembled by first inserting each member 902, 904 through the opposite end block. More specifically, the rod 928 of the first member 902 is inserted through the aperture 926 of the second end block 922 and the rod 930 of the second member 904 is inserted through the aperture 924 of the first end block 920. Subsequently, the inner end 914 of the first member 902 is coupled to the first end block 920 and the inner end 918 of the second member 904 is coupled to the second end block 922. As a result, the members 902, 904 become cross-coupled in the sense that a portion of the first member 902 is retained within a portion of the second member 904 and vice versa. Once the members 902, 904 are coupled in this manner, the adjustment mechanism 910 may be inserted through the second end block 922 and made to engage the threaded surface of the first end block 920, which in the illustrated example is the threaded hole 936 of the barrel nut 932. As a result of this arrangement, member 902, 904 mutually reinforce each other and the panelboard guard assembly 900 becomes increasingly more difficult to tamper with or disassemble.

As previously noted, FIG. 11 illustrates the panelboard guard assembly 900 in use. More specifically, FIG. 11 illustrates the panelboard guard assembly 900 coupled to a panelboard 1000. As shown in FIG. 11, the panelboard 1000 includes a panelboard cover 1002 and panelboard access door 1004. The panelboard cover 1002 may attached to the panelboard 1000, such as by screws or other fasteners (not illustrated). According to one implementation of the present disclosure, the panelboard guard 900 can be placed horizontally across the face of the panelboard 1000 in an area that will cross and capture the access door 1004 of the panelboard 1000, thereby securing the access door 1004. More specifically, the mounting structures 940, 942 of the panelboard guard assembly 900 are first wrapped around the outside edges 1008, 1010 of the panelboard cover 1002 such that the outside edges 1008, 1010 are received in the respective slots 948, 950 of the structures mounting structures 948, 950 and the rods 928, 930 are made to extend across the access door 1004 and cover 1002.

With the panelboard guard assembly 900 so engaged with the panelboard cover 1002, the adjustment mechanism 910 may be tightened. For example, the adjustment mechanism 910 may be rotated such that the threaded member 928 engages and/or advances relative to the threaded surface of the barrel nut 932. Doing so draws the first end 906 and the second end 908 of the panelboard guard assembly 900 closer together or otherwise shortens the overall length of the panelboard guard assembly 900 between the first end 906 and the second end 908. By pulling the members 902, 904 together in such a manner, the panelboard cover edges 1008, 1010 are received more deeply and/or engaged more firmly within the mounting structures 940, 942, preventing the panelboard guard assembly 900 from being removed or disengaged from the panelboard cover 1002. In other words, the panelboard guard assembly 900 is secured across the panelboard 1000 by first securing the first and second ends 906, 908 of the panelboard guard assembly 900 around the outside edges 1008, 1010 of the panelboard cover 1000 using the mounting structures 940, 942. The members 902, 904 are then pulled together by threading the threaded member 928 of the adjustment mechanism 910 through the barrel nut 932 (or other threaded surface). Subsequent tightening of the adjustment mechanism 910 tightens the engagement between the panelboard assembly 900 and the panelboard 1000.

Once the panelboard guard assembly 900 is securely attached to the panelboard cover 1002, a lockout/tag-out device 1030 can be used to prevent tampering with or disassembling of the panelboard guard assembly 900 or otherwise further prevent access to the panelboard 1000 and its contents. As previously noted, the lockout/tag-out device 1030 may take various forms including, without limitation, a lockout hasp or lockout tag. In the example of FIG. 11, the lockout/tag-out device 1030 is illustrated as a padlock. In general and regardless of the type of lockout/tag-out device 1030 used, the lockout/tag-out device 1030 has a portion that extends through the adjustment mechanism 910 (e.g., through the eye 911 when the adjustment mechanism 910 is an eyebolt) and through the aperture 952 defined by the end block 922 of the panelboard guard assembly 900 (each of the eye 911 and aperture 952 being indicated in FIG. 10A). Doing so prevents or substantially reduces the degree to which the adjustment mechanism 910 may be loosened or removed and, as a result, the degree to which the distance between the first end 906 and the second end 908 may be increased.

To further prevent tampering, in at least certain implementations, the depth of the slots 950, 952 (shown in FIG. 10A) are chosen such that the change in length of the panelboard guard assembly 900 required to release the outside edges 1008, 1010 of the panelboard 1000 is greater than the change in overall length of the panelboard guard assembly 900 achievable when a lockout device is applied. In other words, the mounting structures 940, 942 are designed to sufficiently wrap around the outside edges 1008, 1010 of the panelboard 1000 such that the length of the panelboard guard assembly 1000 can only be sufficiently changed to remove the panelboard guard assembly 900 if and when a lockout/tag-out device is not present.

The implementations illustrated in FIGS. 9-11 may be modified in various ways and remain within the scope contemplated by the current disclosure. In general, however, the panelboard guard assembly includes a pair of members that are movable relative to each other (e.g., by sliding the members relative to each other) to modify the overall length of the panelboard guard assembly. At least a portion of the members overlap or are otherwise retained by the opposite member such that the inner end of each member is disposed between the inner and outer ends of the opposite member. For example, in certain implementations, the members may include end blocks disposed at their inner ends and each member may extend through the end block of the opposite member. To do so, each end block may include an aperture through which the opposite member extends. An adjustment mechanism, such as an eyebolt, extends between the end blocks to adjust the overall length of the panelboard guard assembly. Each member further includes an outer end including a mounting feature for coupling the panelboard guard assembly to a panelboard cover.

Variations of the foregoing are contemplated. For example, in at least one alternative implementation, one of the members extends through the end block of the other member, while the other member may extend adjacent to the end block of the opposite member (i.e., the other member is not fully retained by the opposite end block) Similarly, instead of an aperture, one or both of the end blocks may instead include a channel or cutout through which the opposite member extends.

It should be appreciated that the term "block" as used herein (for example, in reference to the end blocks 920, 922) is intended merely to indicate a structural body and should not imply that any "block" components are limited to a particular size or shape. Similarly, to the extent particular shapes of components are illustrated in the figures (e.g., the rods 928, 930 being circular or the mounting structures 940, 942 being generally cubic), such shapes should be regarded merely as non-limiting examples. For example, with respect to the mounting structure 940, 942, the cubic structures illustrated in FIGS. 9-11 may be replaced by the strap-based mounting structures illustrated in FIGS. 1-5C, among other designs. The mounting structures 940, 942 may also be modified to have a notch (such as notch 225 shown in FIG. 2E) such that the mounting structures 940, 942 may receive a screw or similar element of a panelboard. More generally, it should be appreciated that aspects of any of the foregoing implementations, including the shapes of individual components, may be readily combined with each other and the result remain within the scope of the current disclosure.

Components of panelboard guard assemblies, such as panelboard guard assembly 900 of FIG. 9, may be formed from various materials including, without limitation, metals, plastics, and fibers and may be manufactured using various techniques including, without limitation, one or more of injection molding, casting, machining, extrusion, three-dimensional printing, and the like. Moreover, the size and shape of the panelboard guard assembly may be varied based on the particular application for which the panelboard guard assembly is to be used. For example, panelboard guard assemblies according to the present disclosure may be manufactured to have various overall lengths adapted to accommodate panelboards of varying sizes, including panelboard having any standard or non-standard dimensions. The panelboard guard assembly may also be manufactured to be easily noticeable, such as by applying a noticeable paint color to some or all of the assembly.

Although aspects of the present disclosure have been described with reference to preferred embodiments, persons skilled in the art will recognize that changes may be made in form and detail without departing from the spirit and scope of the disclosure.

What is claimed is:

1. A panelboard guard assembly configured to restrict access to a panelboard having a cover and a door defined therein by using a safety lockout, the cover having first and second side boundaries, the panelboard guard assembly comprising:
   a first member including a first outer end and a first inner end, the first outer end comprising a first open channel, the first open channel shaped to extend about and releasably receive the first side boundary to couple the first member to the first side boundary;
   a second member including a second outer end and a second inner end, the second outer end comprising a second open channel shaped to extend about and releasably receive the second side boundary to couple the second member to the second side boundary; and
   an adjustment member extending between the first inner end and the second inner end,
   wherein the adjustment member is configured such that rotation of the adjustment member relative to each of the first inner end and the second inner end results in a change in a distance between the first outer end and the second outer end, and
   wherein the first member and the second member are arranged such that at least a portion of the first member is disposed between the second outer end and the second inner end.

2. The panelboard guard assembly of claim 1, wherein at least a portion of the second member is disposed between the first outer end and the first inner end.

3. The panelboard guard assembly of claim 1, wherein the first inner end includes an end structure through which the second member extends.

4. The panelboard guard assembly of claim 1, wherein the second inner end includes an end structure through which the first member extends.

5. The panelboard guard assembly of claim 1, wherein:
   the first inner end includes a first end structure through which the second member extends, the second inner end includes a second end structure through which the first member extends, and the adjustment member extends through each of the first end structure and the second end structure.

6. The panelboard guard assembly of claim 1, wherein:
the first inner end includes a first end structure through which the second member extends,
the second inner end includes a second end structure through which the first member extends,
the second end structure includes a bore through which the adjustment member extends, and
the first end structure includes a threaded surface that engages a thread of the adjustment member.

7. The panelboard guard assembly of claim 1, wherein:
the first inner end includes a first end structure through which the second member extends,
the second inner end includes a second end structure through which the first member extends,
the second end structure includes a bore through which the adjustment member extends,
the first end structure includes a threaded surface that engages a thread of the adjustment member, and
the threaded surface is a threaded bore of a barrel nut disposed within the first end structure.

8. The panelboard guard assembly of claim 1, wherein the adjustment member includes a first aperture and one of the first member and the second member includes a second aperture, the first aperture and the second aperture arranged to each receive the safety lockout to prevent movement of the first member relative to the second member.

9. The panelboard guard assembly of claim 1, wherein the adjustment member is an eyebolt extending between the first inner end and the second inner end.

10. A panelboard guard assembly configured to restrict access to a panelboard having a cover and a door defined therein by using a safety lockout, the cover having first and second side boundaries, the panelboard guard assembly comprising:
a first member including a first outer end and a first open channel shaped to extend about and releasably receive the first side boundary to couple the first member to the first side boundary;
a second member including a second outer end and a second open channel shaped to extend about and releasably receive the second side boundary to couple the second member to the second side boundary; and
an adjustment member extending between the first member and the second member,
wherein the adjustment member is configured such that rotation of the adjustment member relative to both the first member and the second member results in a change in a distance between the first outer end and the second outer end, and
wherein the first member and the second member are cross-coupled such that a first portion of the first member is retained by a first portion of the second member and a second portion of the second member is retained by a second portion of the first member.

11. The panelboard guard assembly of claim 10, wherein:
the first member includes a first inner end including a first end structure and the second member includes a second inner end including a second end structure,
the first member is retained within the second end structure, and
the second member is retained within the first end structure.

12. The panelboard guard assembly of claim 10, wherein, the cross-coupling of the first member and the second member permits sliding of the first member relative to the second member absent the adjustment member.

13. A panelboard guard assembly configured to restrict access to a panelboard having a cover and a door defined therein by using a safety lockout, the cover having first and second side boundaries, the panelboard guard assembly comprising:
a first member including a first outer end comprising a first open channel shaped to extend about and releasably receive the first side boundary to couple the first member to the first side boundary;
a second member including a second outer end comprising a second open channel shaped to extend about and releasably receive the second side boundary to couple the second member to the second side boundary; and
an adjustment mechanism operably coupling the first member to the second member,
wherein the adjustment mechanism is configured to couple to the first member via the safety lockout,
wherein the adjustment member is configured such that rotation of the adjustment member relative to both the first outer end and the second outer end changes a distance between the first outer end and the second outer end, and
wherein a first portion of the first member extends through a first portion of the second member.

14. The panelboard guard assembly of claim 13, wherein a second portion of the second member extends through a second portion of the first member.

15. The panelboard guard assembly of claim 13, wherein the first and second boundaries are first and second exterior edges of the cover, respectively.

16. The panelboard guard assembly of claim 13, wherein, absent the adjustment mechanism, the first member and the second member are slidable relative to each other.

17. The panelboard guard assembly of claim 13, wherein the first member includes a threaded surface that engages the adjustment mechanism and the second member includes an aperture through which the adjustment mechanism extends.

18. The panelboard guard assembly of claim 13, wherein:
the first member includes a threaded surface that engages the adjustment mechanism, and
the first member includes a barrel nut including the threaded surface.

* * * * *